(12) United States Patent
Chaudhri

(10) Patent No.: US 7,873,916 B1
(45) Date of Patent: Jan. 18, 2011

(54) COLOR LABELING IN A GRAPHICAL USER INTERFACE

(75) Inventor: Imran Chaudhri, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 705 days.

(21) Appl. No.: 10/875,076

(22) Filed: Jun. 22, 2004

(51) Int. Cl.
*G06F 3/048* (2006.01)

(52) U.S. Cl. .................. 715/823; 715/765; 715/767; 715/802; 715/810; 715/821; 715/822; 715/859; 715/860; 715/861

(58) Field of Classification Search .......... 715/810, 715/853–859, 846, 765, 763, 764, 766–768, 715/775, 777, 783, 794, 802, 803, 807, 817, 715/821, 823, 860, 861
See application file for complete search history.

(56) References Cited

U.S. PATENT DOCUMENTS

| | | | | |
|---|---|---|---|---|
| 4,570,182 A | * | 2/1986 | Johnson et al. | 348/578 |
| 4,698,625 A | * | 10/1987 | McCaskill et al. | 345/157 |
| 5,103,407 A | * | 4/1992 | Gabor | 345/601 |
| 5,142,615 A | * | 8/1992 | Levesque et al. | 345/595 |
| 5,249,263 A | * | 9/1993 | Yanker | 345/594 |
| 5,357,603 A | * | 10/1994 | Parker | 715/765 |
| 5,371,553 A | * | 12/1994 | Kawamura et al. | 725/59 |
| 5,371,844 A | * | 12/1994 | Andrew et al. | 715/747 |
| 5,459,831 A | * | 10/1995 | Brewer et al. | 715/853 |
| 5,565,888 A | * | 10/1996 | Selker | 715/823 |
| 5,659,475 A | * | 8/1997 | Brown | 701/120 |
| 5,680,558 A | * | 10/1997 | Hatanaka et al. | 715/838 |
| 5,687,331 A | * | 11/1997 | Volk et al. | 715/840 |
| 5,689,286 A | * | 11/1997 | Wugofski | 715/835 |
| 5,704,051 A | * | 12/1997 | Lane et al. | 715/855 |
| 5,736,974 A | * | 4/1998 | Selker | 715/862 |
| 5,751,287 A | * | 5/1998 | Hahn et al. | 715/775 |
| 5,754,178 A | * | 5/1998 | Johnston et al. | 715/769 |
| 5,774,119 A | * | 6/1998 | Alimpich et al. | 715/764 |
| 5,797,139 A | * | 8/1998 | Amro | 707/100 |

(Continued)

OTHER PUBLICATIONS

"Dynamically generating color families and assigning colors to differentiate multi-level hierarchical groups," IBM Technical Disclosure Bulletin, Jul. 2001, UK, Issue: 447, p. 1240, TDB-ACC-No. NNRD447147.*

(Continued)

*Primary Examiner*—Weilun Lo
*Assistant Examiner*—Eric Wiener
(74) *Attorney, Agent, or Firm*—Adeli & Tollen LLP

(57) ABSTRACT

A method for providing visual cues to a user of a graphical user interface (GUI) for a computer system is disclosed. The visual cues indicate a relationship with an icon having text and/or image elements. In some embodiments, the method receives a color for labeling an icon that has a text-element and an image-element. The method applies the color to a background-region of the text-element of the icon without applying the color to the image-element. In some embodiments, the method does not affect the font of the text. In some embodiments, the method receives a selection of an icon. The icon has a background-region that has a first color. The method changes the first color of the background-region to a second color but retains the first color in a section of the background-region. In some of these embodiments, the method outlines the section of the background-region with a third color.

35 Claims, 17 Drawing Sheets

U.S. PATENT DOCUMENTS

| | | | | |
|---|---|---|---|---|
| 5,805,165 | A * | 9/1998 | Thorne et al. | 715/823 |
| 5,835,919 | A * | 11/1998 | Stern et al. | 715/209 |
| 5,844,559 | A | 12/1998 | Guha | |
| 5,940,078 | A * | 8/1999 | Nagarajayya et al. | 715/859 |
| 5,959,624 | A * | 9/1999 | Johnston et al. | 715/746 |
| 5,963,206 | A * | 10/1999 | Ulrich et al. | 715/788 |
| 5,987,469 | A | 11/1999 | Lewis et al. | |
| 6,100,873 | A * | 8/2000 | Bayless et al. | 345/593 |
| 6,175,364 | B1 * | 1/2001 | Wong et al. | 715/763 |
| 6,188,399 | B1 * | 2/2001 | Voas et al. | 715/723 |
| 6,229,536 | B1 * | 5/2001 | Alexander et al. | 345/440.1 |
| 6,239,795 | B1 * | 5/2001 | Ulrich et al. | 715/866 |
| 6,326,962 | B1 * | 12/2001 | Szabo | 715/762 |
| 6,466,228 | B1 * | 10/2002 | Ulrich et al. | 345/619 |
| 6,469,660 | B1 * | 10/2002 | Horvath et al. | 342/179 |
| 6,476,834 | B1 * | 11/2002 | Doval et al. | 715/863 |
| 6,496,208 | B1 * | 12/2002 | Bernhardt et al. | 715/853 |
| 6,501,490 | B1 * | 12/2002 | Bell | 715/837 |
| 6,690,382 | B1 | 2/2004 | Tanigawa et al. | |
| 6,750,879 | B2 * | 6/2004 | Sandberg | 715/714 |
| 6,765,597 | B2 | 7/2004 | Barksdale et al. | |
| 6,826,729 | B1 * | 11/2004 | Giesen et al. | 715/837 |
| 6,873,337 | B1 * | 3/2005 | Fernandez et al. | 345/581 |
| 6,917,373 | B2 * | 7/2005 | Vong et al. | 715/840 |
| 6,928,625 | B2 * | 8/2005 | Makinen | 715/822 |
| 6,948,134 | B2 * | 9/2005 | Gauthier et al. | 715/804 |
| 6,958,758 | B2 * | 10/2005 | Ulrich et al. | 345/619 |
| 6,990,638 | B2 * | 1/2006 | Barksdale et al. | 715/853 |
| 7,017,122 | B1 * | 3/2006 | Lee et al. | 715/812 |
| 7,075,550 | B2 * | 7/2006 | Bonadio | 345/589 |
| 7,086,011 | B2 * | 8/2006 | Budrys et al. | 715/837 |
| 7,107,545 | B2 * | 9/2006 | Adleman | 715/767 |
| 7,194,699 | B2 * | 3/2007 | Thomson et al. | 715/823 |
| 7,216,303 | B2 * | 5/2007 | Aggarwal et al. | 715/825 |
| 7,322,007 | B2 * | 1/2008 | Schowtka et al. | 715/243 |
| 7,573,487 | B1 * | 8/2009 | Petersen | 345/629 |
| 7,716,601 | B2 * | 5/2010 | Yoshida | 715/821 |
| 7,719,542 | B1 * | 5/2010 | Gough et al. | 345/581 |
| 2001/0020956 | A1 * | 9/2001 | Moir | 345/765 |
| 2002/0171624 | A1 * | 11/2002 | Stecyk et al. | 345/156 |
| 2003/0063797 | A1 * | 4/2003 | Mao | 382/162 |
| 2003/0156119 | A1 * | 8/2003 | Bonadio | 345/589 |
| 2003/0214539 | A1 * | 11/2003 | Iwema et al. | 345/861 |
| 2004/0216156 | A1 * | 10/2004 | Wagner | 725/39 |
| 2005/0039142 | A1 * | 2/2005 | Jalon et al. | 715/823 |
| 2005/0188332 | A1 * | 8/2005 | Kolman | 715/822 |
| 2005/0253865 | A1 * | 11/2005 | Proteau et al. | 345/592 |

OTHER PUBLICATIONS

Microsoft Windows XP Screenshots, Date Unknown.
U.S. Appl. No. 10/875,077, filed Jun. 22, 2004, Ording, Bas.
Non Final Office Action of U.S. Appl. No. 10/875,077, May 11, 2007 (mailing date), Ording, Bas.
Final Office Action of U.S. Appl. No. 10/875,077, Dec. 11, 2007 (mailing date), Ording, Bas.
Non-Final Office Action of U.S. Appl. No. 10/875,077, Aug. 15, 2008 (mailing date), Ording, Bas.

* cited by examiner

US 7,873,916 B1

COLOR LABELING IN A GRAPHICAL USER INTERFACE

FIELD OF THE INVENTION

The present invention concerns the field of graphical user interfaces for computer systems. Specifically, the invention is directed towards methods for providing visual cues and color labeling in a graphical user interface (GUI).

BACKGROUND OF THE INVENTION

A computer operating system or application program can provide different views of a computer system's contents to a user through a GUI. Three such views in a GUI are an icon view, a list view, and a column view. In each view, icons are typically used to represent the computer system's contents. A computer system's contents are typically organized in a hierarchical "file system" of nested folders (directories) and files. An icon in the GUI can have two components, an image component and a text component. The icons are presented to a user of the GUI in different visual formats in each view (icon, list, or column view). The different visual formats are designed to present information in ways that facilitate understanding and manipulation of their contents. However, manipulation of the icons and views can alter the icon's appearance and thus obscure the icon's visual information. Also, the volume of information presented in each view of a file system can be large such that a high demand is placed on the attention and concentration of the user of the GUI.

As such, there is a need for a method of providing visual cues for interacting with icons that, for example, represent folders and files presented in a GUI.

SUMMARY OF THE INVENTION

The invention provides a method for providing visual cues to a user of a graphical user interface (GUI) for a computer system. In some embodiments, the method receives a color for labeling an icon that has a text-element and an image-element. The method applies the color to a background-region of the text-element of the icon without applying the color to the image-element. In some embodiments, the method does not affect the font of the text.

In some embodiments, the method receives a selection of an icon. The icon has a background-region that has a first color. The method changes the first color of the background-region to a second color but retains the first color in a section of the background-region. In some of these embodiments, the method outlines the section of the background-region with a third color.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
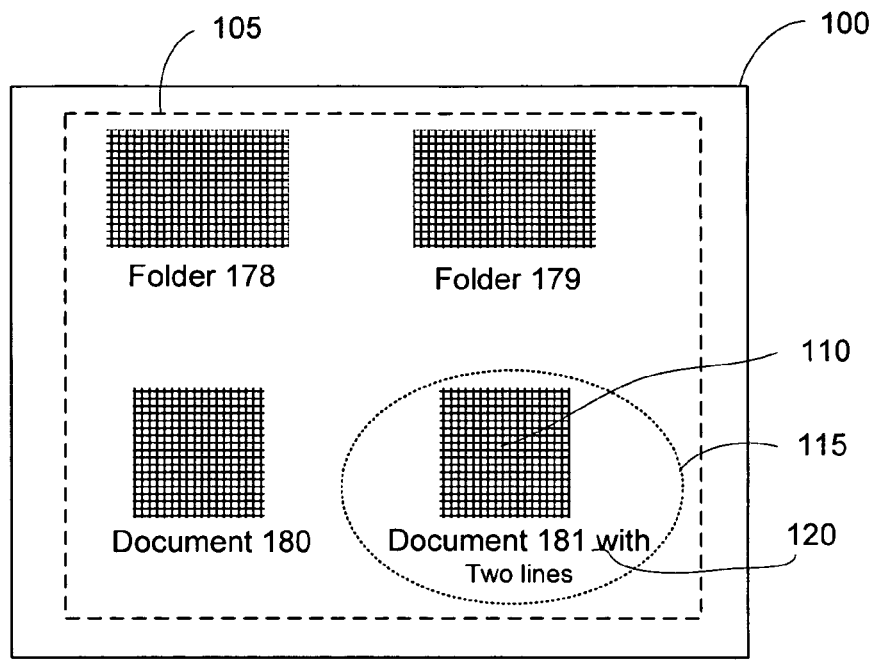
FIG. 1 illustrates a window in a GUI. The window presents an "icon-view" illustration of icons represented in the GUI.

In the following description, numerous details are set forth for purposes of explanation. However, one of ordinary skill in the art will realize that the invention may be practiced without the use of these specific details. In other instances, well-known structures and devices are shown in block diagram form in order not to obscure the description of the invention with unnecessary detail.

I. DEFINITIONS

A graphical user interface ("GUI") is an interface of a computer system that allows users to interact with the computer system through images and text. A GUI allows users of the computer system to interact with the computer system in an intuitive graphical manner. Instead of learning and writing complex command languages, users can perform many operations by simply interacting with the visual components of a GUI, which are often easy to understand. A GUI often includes a cursor pointer, icons, desktop, windows, etc. The cursor pointer (the "cursor") is a pointer that a user can move across the GUI through the operation of a cursor controller, such as a mouse, a trackpad, trackball, etc. A user can use the cursor to select objects in the GUI. For instance, the user can select an object by directing the cursor to the object and performing a click operation (e.g., through a button of the cursor controller).

Icons are examples of selectable objects in a GUI. Icons are used to represent folders, files, commands, etc. in the GUI. An icon can be represented by a text element, an image element, or both text and image elements in the GUI. The desktop refers to the contents on a display screen below any windows. A window is an area on the display screen that displays its own file, message, application, etc. independently of other windows that are displayed on the display screen.

A color, as used herein, can be any color of the visible light spectrum. A Macintosh computer, for example, can output to a display, millions of colors and can output thousands of different shades of gray. As used in this application, two colors are different colors when they are two different colors in the spectrum of visible light, or are two different shades of the same color.

A file, as used herein, is an elemental data object within a file system. A file can contain various types of data. For example, a file can contain executable data as part of an application program or as part of the operating system. A file may also contain data that was created by an application. A file created by an application may also be referred to as a document. Thus, a user of a computer system GUI may open an application by selecting and opening an executable file that runs an application, such as a word-processor. Then the user may operate the word-processor to create a document file.

A folder, as used herein, is an icon that represents a directory in a hierarchical file system. A folder can contain other folders or files. The hierarchy of a file system is created when folders are nested inside other folders.

A volume, as used herein, is a logical partition on a single computer storage device or across several computer storage devices. For example, a volume can be comprised of a single hard disk. As another example, a volume can be comprised of a redundant array of independent disks (RAID). A volume is typically used to store the folders and files of a hierarchical file system.

II. OVERVIEW

The invention provides a method for providing visual cues related to the selection and color-labeling of icons in a GUI. In some embodiments, the method receives a color for labeling an icon that has a text-element and an image-element. The method applies the color to a background-region of the text-element of the icon without applying the color to the image-element. In some embodiments, the method does not affect the font of the text. In some embodiments, the background-region has a shape and the color is applied to the shape.

In some embodiments, the method receives a selection of an icon. The icon has a background-region that has a first color. The method changes the first color of the background-region to a second color but retains the first color in a section of the background-region. In some of these embodiments, the method outlines the section of the background-region with a third color.

Some embodiments of the invention may be implemented in a computer operating system that presents different views of a file system to aid in comprehension of the data presented. Three such views are an icon view, a list view, and a column view. In some embodiments, the icon-view presents the contents of a folder or volume in terms of a number of freestanding icons that can be moved around the window. In the icon-view, icons are presented with both their image and text elements. For icons with only one element, that element is presented in the GUI. Icon-view is useful for viewing the image element of the icon, as the image element is presented in its largest form in icon-view. Icon-view is also useful for file and folder manipulation such as a drag-and-drop operation, as the icon is large and easily selected using a cursor controller.

In some embodiments, the list-view presents the contents of a folder as a set of icons in a single-column format. List-view is useful for displaying the detailed information about objects in the file system. List-view is often used to view several icons representing objects in the file system in a sorted and ordered single-column list. Icons in list-view can be shown with their graphic elements reduced in size or without their graphic elements to enhance comprehension of the detailed information presented.

Column-view is similar to list view, except that column view can be used to show multiple nested objects at once in several columns side-by-side. For example, the contents of a folder in a first column can be shown in a second column to the right of the first column. The contents of a folder in the second column can be shown in a third column to the right of the second column, and so forth. By placing several columns containing nested objects from left to right in a single window of the GUI, column view can be used to show the nested structure of a hierarchical file system.

Some embodiments of the invention that apply color-labeling to icons presented in an icon-view, a list-view, and column-view illustrations are described below.

III. ICON-VIEW

FIG. 1 illustrates a window 100 in a GUI. Window 100 presents an "icon-view" illustration 105 of four icons, two of which represent folders 178 and 179, and two of which represent documents 180 and 181. An icon-view illustration presents the contents of a folder or volume in terms of a number of freestanding icons that can be moved around the window.

As shown in FIG. 1, each of the four icons in window 100 contains an image element and a text element. For instance, the document icon 115 contains image element 110 and text element 120. Also, as shown by the icon 115, the text element of certain icons might appear on more than one line. In the icon-view illustration of FIG. 1, no icon has been color-labeled.

Figure 2:
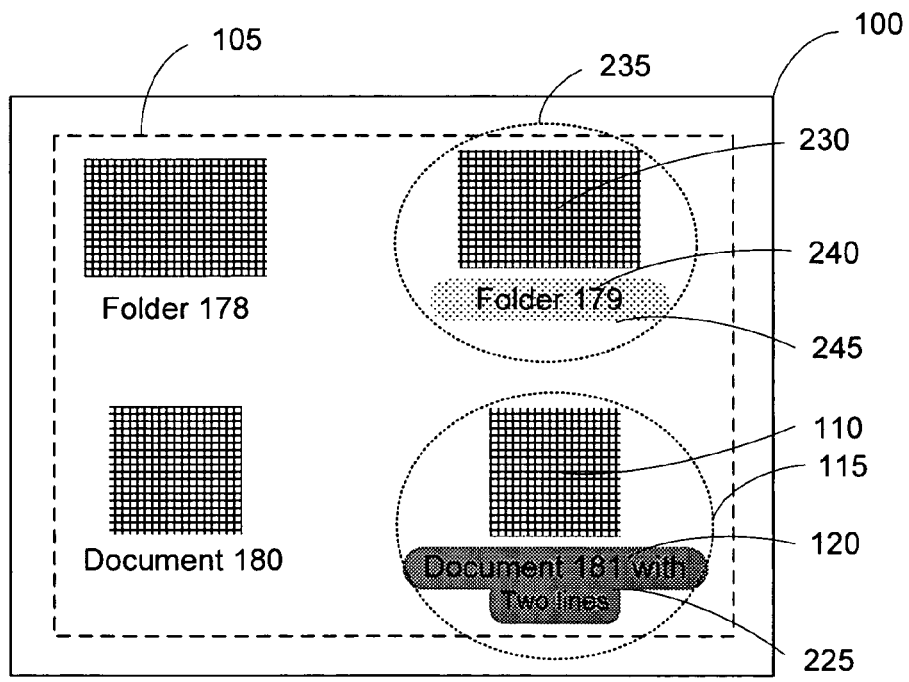
FIG. 2 illustrates a window after a folder icon and a document icon have been color labeled according to some embodiments of the present invention.

FIG. 2 illustrates the window 100 after folder icon 235 and document icon 115 have been color labeled according to some embodiments of the invention. Specifically, in this figure, a first color has been applied to a background region 225 that surrounds the text element 120 of the document icon 115 without encompassing the image element 110 of this icon. Also, a second color has been applied to a background region 245 that surrounds the text element 240 of the folder icon 235 without encompassing the image element 230 of this icon. As shown in FIG. 2, the color-labeling of the text element does not distort the color of the font of the text element in some embodiments. Also, as shown in this figure, some embodiments define the colored background regions to have rounded ends to improve their visual appeal. This rounding is even extended to a background region that encompasses multiple lines of text, as illustrated by the color label applied to the text element 120 of the icon 115

Figure 3:
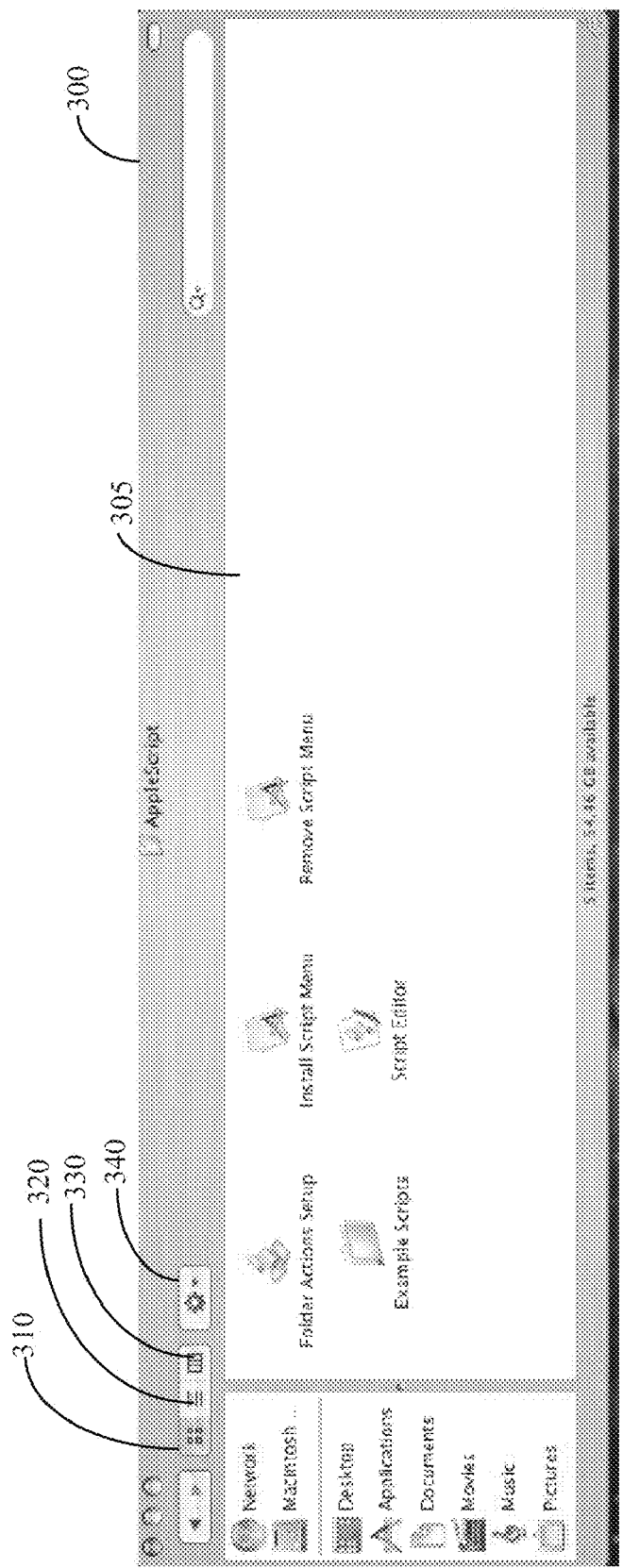
FIG. 3 illustrates a window that presents an icon-view illustration of a folder AppleScript.

FIGS. 3-7 illustrate one manner of applying a color label to an icon in some embodiments of the invention. Specifically, FIG. 3 illustrates a window 300 that presents an icon-view illustration 305 of a folder AppleScript. This folder contains five icons, one of which is the icon for a program Remove Script Menu. As shown in FIG. 3 the window 300 includes three buttons 310, 320, and 330, which respectively allow the user to select an icon-view illustration, a list view illustration, and a column-view illustration. This window also includes a button 340, which, as further described below, opens a drop down menu that contains several color label selections.

Figure 4:
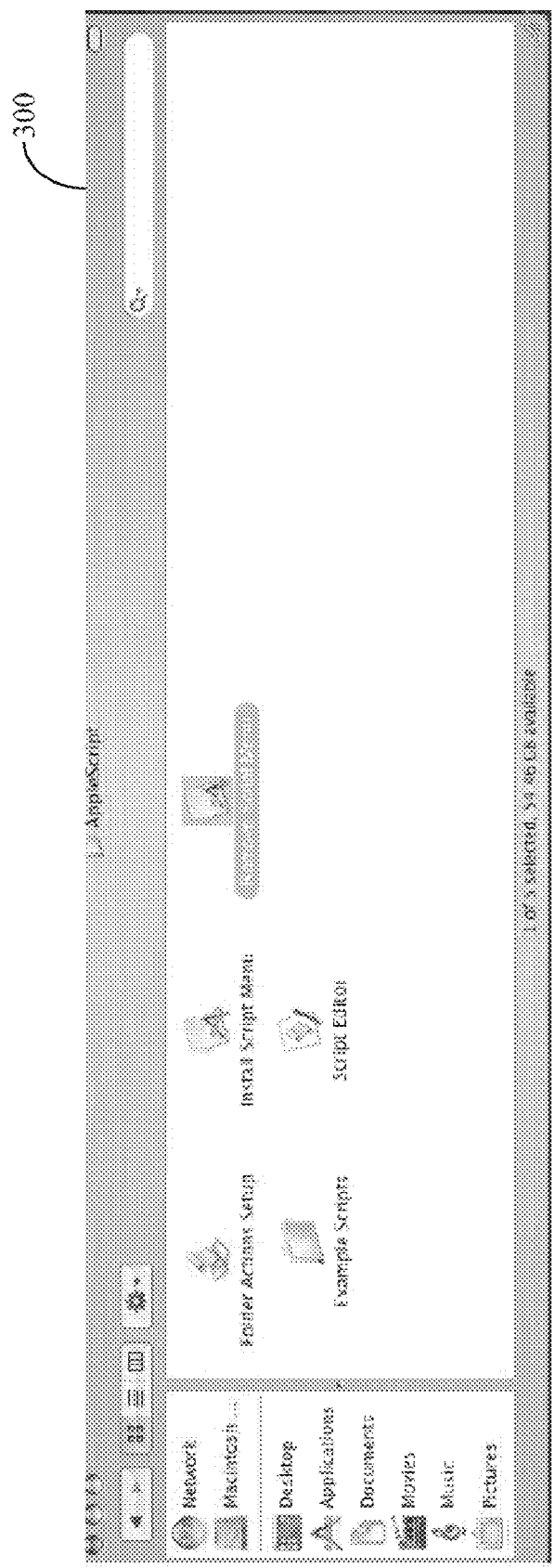
FIG. 4 illustrates a window after selection of an icon for a Remove Script Menu program.
Figure 5:
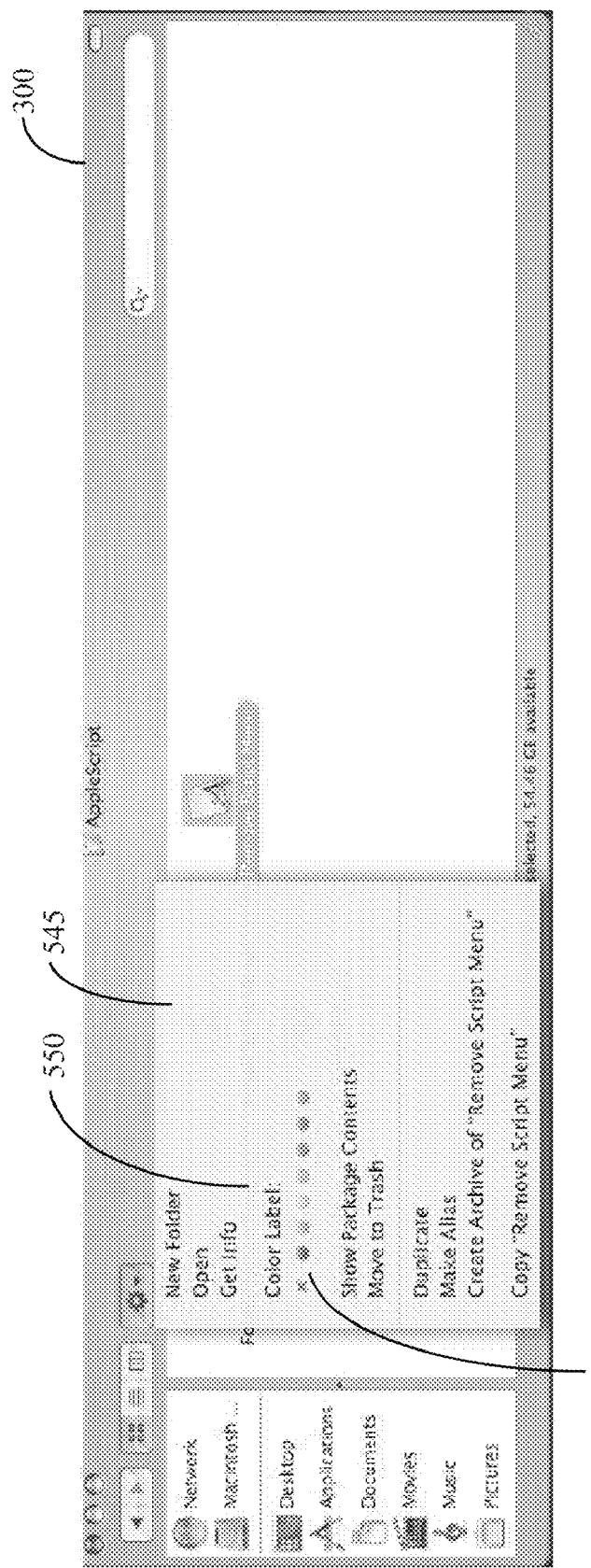
FIG. 5 illustrates a window after a button has been selected and its associated drop-down menu has been opened.
Figure 6:
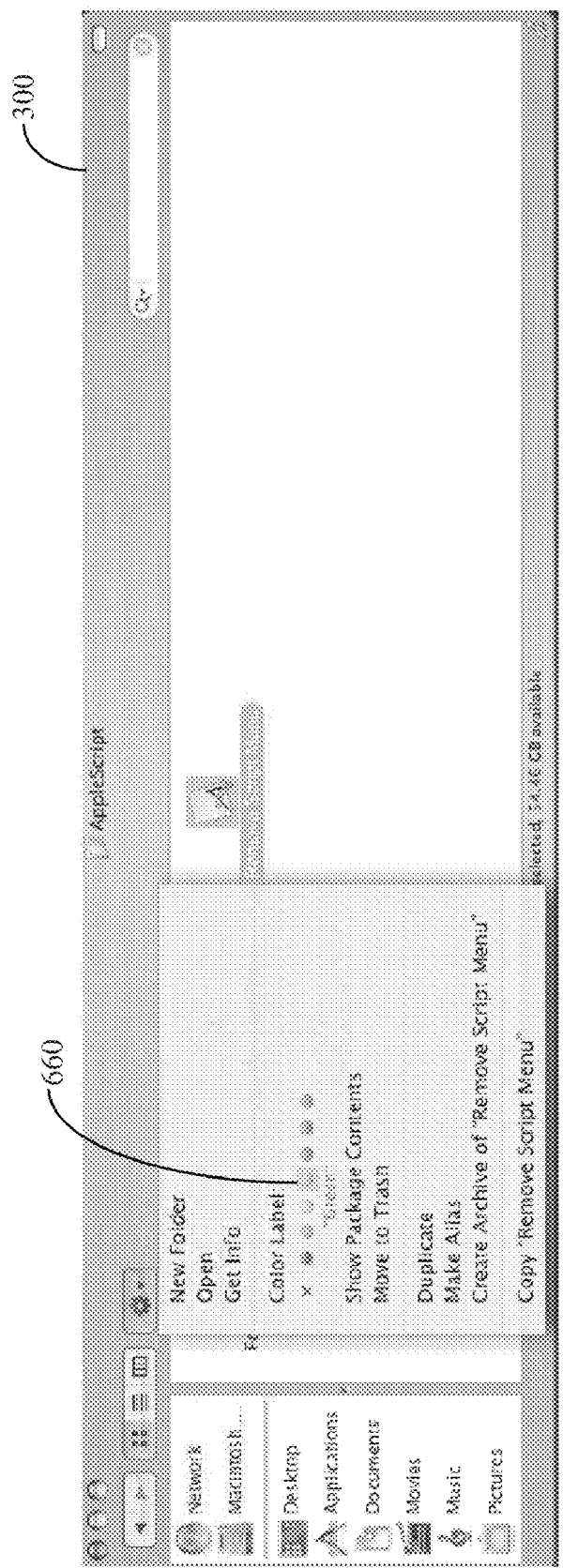
FIG. 6 illustrates a selection of a color icon representing the color Green.
Figure 7:
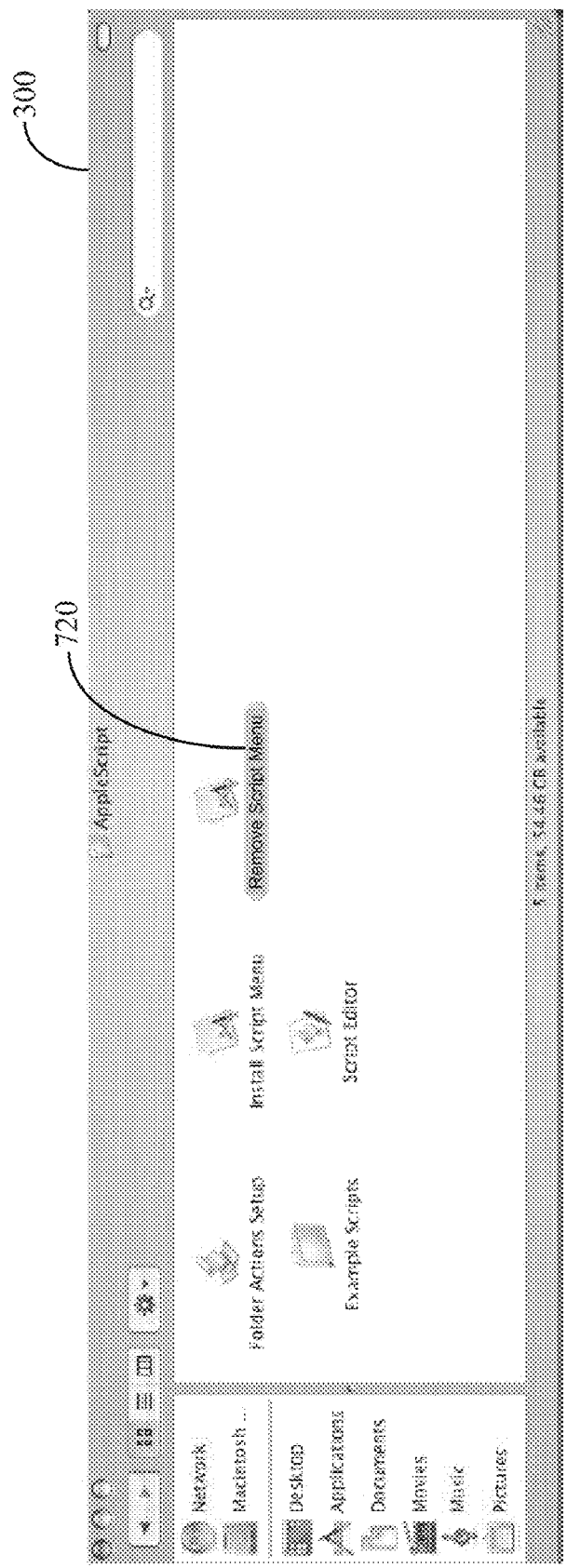
FIG. 7 illustrates application of the color Green to the text element of an icon for a Remove Script Menu program.

FIG. 4 illustrates the window 300 after the selection of the icon of the Remove Script Menu program. Next, FIG. 5 illustrates the window 300 after the button 340 has been selected and its associated drop-down menu 545 has been opened. As shown in this figure, the drop-down menu 545 includes a section 550 that includes several color icons 555, where each icon represents a different color. FIG. 6 then illustrates the selection of the color icon 660 representing the color Green. Finally, FIG. 7 illustrates the application of the color Green to the text element 720 of the icon for the program Remove Script Menu. (As the figures are in black and white, FIG. 7 illustrates the color Green in terms of a shade of the color gray.)

Figure 8:
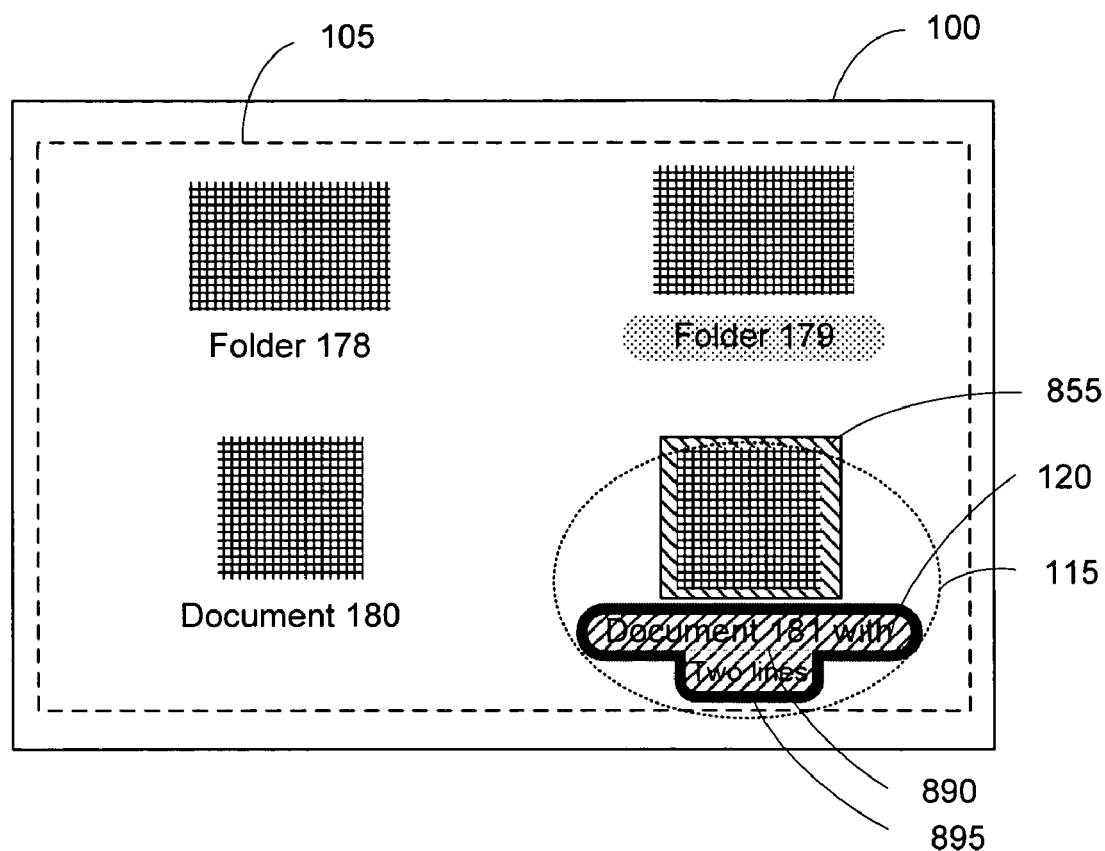
FIG. 8 illustrates a window of FIG. 1 after a user selects a color-labeled document icon.

FIG. 8 illustrates the window 100 of FIG. 1 after the color-labeled document icon 115 has been selected by a user. The selection of icon 115 changes the color of most of the background-region 890 of the icon 115, without distorting either the image element 110 or the text element 120 of the icon 115. (In this figure, a set of diagonal dashed lines is used to show the color that is used to illustrate the selection of the icon 115.)

According to some embodiments of the invention, a section 895 along the background-region 890 retains its original color label to provide a visual clue to the user as to the color label of the selected icon 115. One of ordinary skill will realize that the section 895 can have other shapes in other embodiments. For instance, in some embodiments, this section might be a small geometrical shape on one of the sides of the text element 120 of the icon. Alternatively, when the icon has been selected, some embodiments might not display any portion of the color label of an icon that is displayed in the icon view. In other embodiments of the invention, the color label of an icon and its selection is indicated only using the text element of the icon. These embodiments are advantageous when an icon has no image element, or the icon is displayed without its image element.

In additional embodiments of the invention, as shown in FIG. 8, a selection-border 855 surrounds the image element of icon 115. The selection-border 855 can be used to convey to the user that the icon 115 has been selected. The selection-border 855 can be applied to surround only the image element of icon 115, which can be advantageous when icon 115 has no text element.

Figure 9:
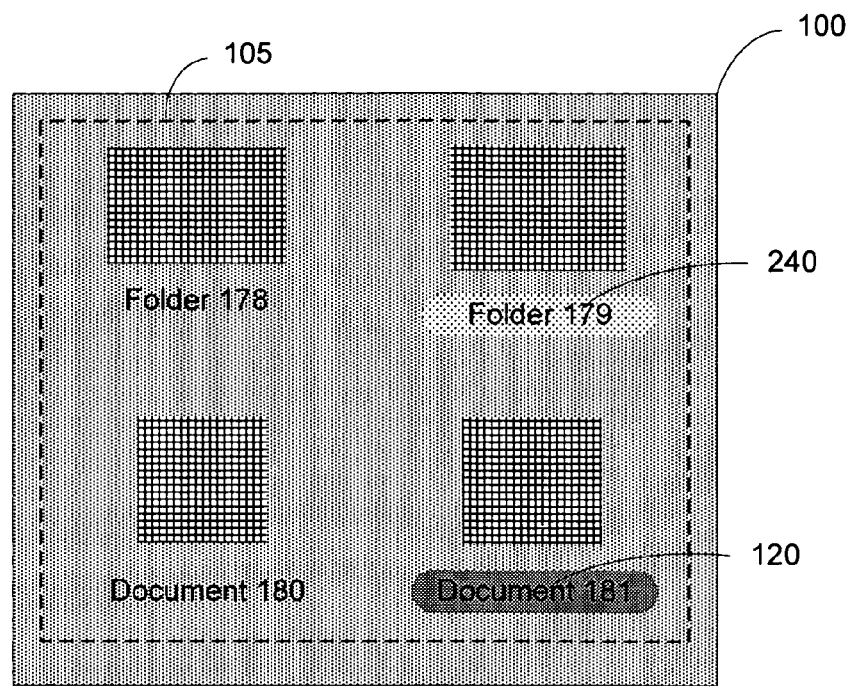
FIG. 9 illustrates a window of FIG. 1 having a non-white pane.
Figure 10:
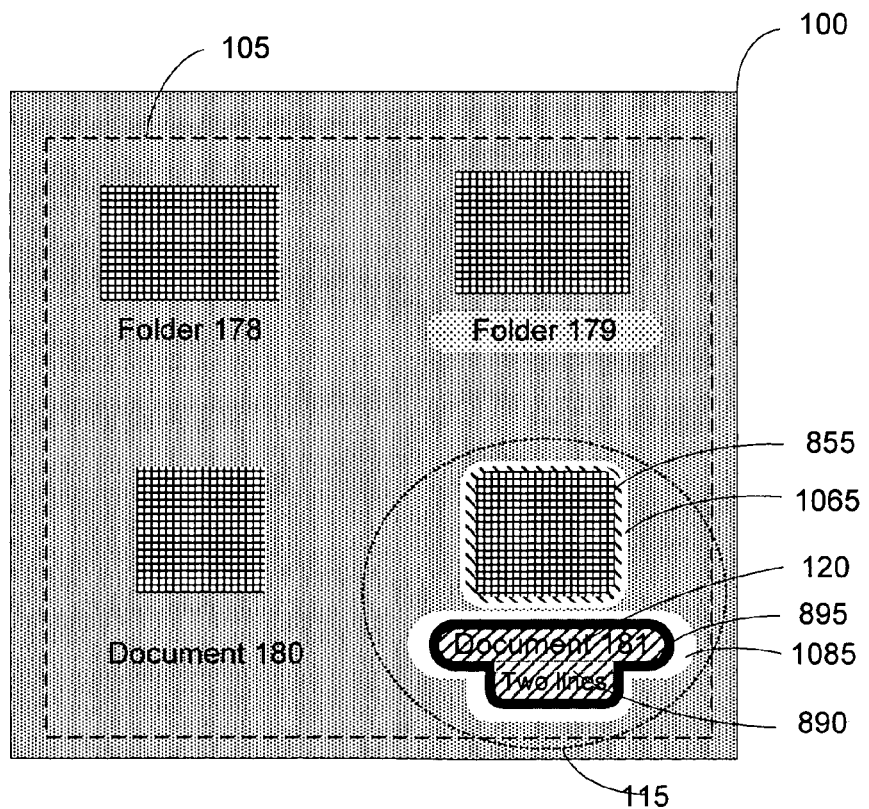
FIG. 10 illustrates a window of FIG. 1 after a user selects a color-labeled document icon.

In the examples illustrated in FIGS. 1-8, the color of the background pane of window 100 is white. In some embodiments, a window in the GUI can have a non-white pane color. FIGS. 9-10 illustrate an example of performing the invention's color labeling on icons in a window that has a non-white pane color.

Specifically, FIG. 9 illustrates the window 100 having a non-white pane. The window 100 presents an icon-view illustration 105 with this non-white pane. The text elements of two icons are color-labeled, text element 120 and text element 240. No icons are selected in FIG. 9.

FIG. 10 illustrates the window 100 of FIG. 1 after the color-labeled document icon 115 has been selected by a user. The selection of icon 115 changes the color of most of the background-region 890 of the icon 115, without distorting either the image element 110 or the text element 120 of the icon 115. (In this figure, a set of diagonal dashed lines is used to show the color that is used to illustrate the selection of the icon 115.)

According to some embodiments of the invention, a section 895 along the background-region 890 retains its original color label to provide a visual clue to the user as to the color label of the selected icon 115. One of ordinary skill will realize that the section 895 can have other shapes in other embodiments. For instance, in some embodiments, this section might be a small geometrical shape on one of the sides of the text element 120 of the icon. Alternatively, when the icon has been selected, some embodiments might not display any portion of the color label of an icon that is displayed in the icon view. In other embodiments of the invention, the color label of an icon and icon selection are indicated using only the text element of the icon. These embodiments are advantageous when an icon has no image element, or the icon is displayed without its image element.

Also shown in FIG. 10, when the background of window 100 is not white, a white-outline 1085 along the section 895 can be used to draw the user's attention to the selected icon 115, and to further delineate the label-color of section 895 from the pane color of window 100.

In additional embodiments of the invention, as shown in FIG. 10, the selection-border 855 surrounds the image element of icon 115. The selection-border 855 can be used to convey to the user that the icon 115 has been selected. The selection-border 855 can be applied to surround only the image element of icon 115, which can be advantageous when icon 115 has no text element.

When the pane of window 100 is not white, a white-outline 1065 can be applied to surround the selection-border 855, according to some embodiments of the present invention. White-outline 1065 draws the user's attention to the selected icon 115 and offsets the selection-border 855 from the window 100.

IV. LIST-VIEW

Figure 11:
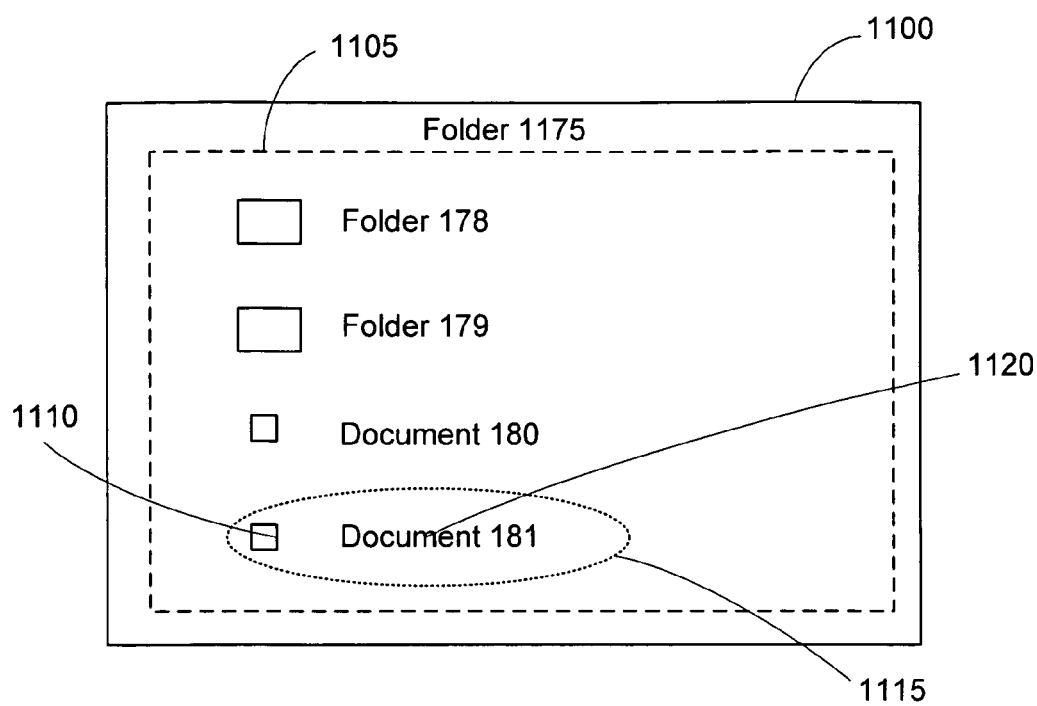
FIG. 11 illustrates a window in a GUI. This window provides a "list-view" illustration of the contents of a folder.

FIG. 11 illustrates a window 1100 in a GUI. This window provides a "list-view" illustration 1105 of the contents of a folder 1175. In some embodiments, a list-view illustration presents the contents of a folder as a set of icons in a single-column format. For instance, in the example illustrated in FIG. 11, the list-view illustration 1105 presents four icons, two of which represent folders 178 and 179, and two of which represent documents 180 and 181. Each of the four icons in list-view illustration 1105 includes an image element and a text element. For example, the icon 1115 for the document 181 includes an image element 1110 and a text element 1120. In list-view illustration 1105, no folder or document has been selected or labeled.

Figure 12:
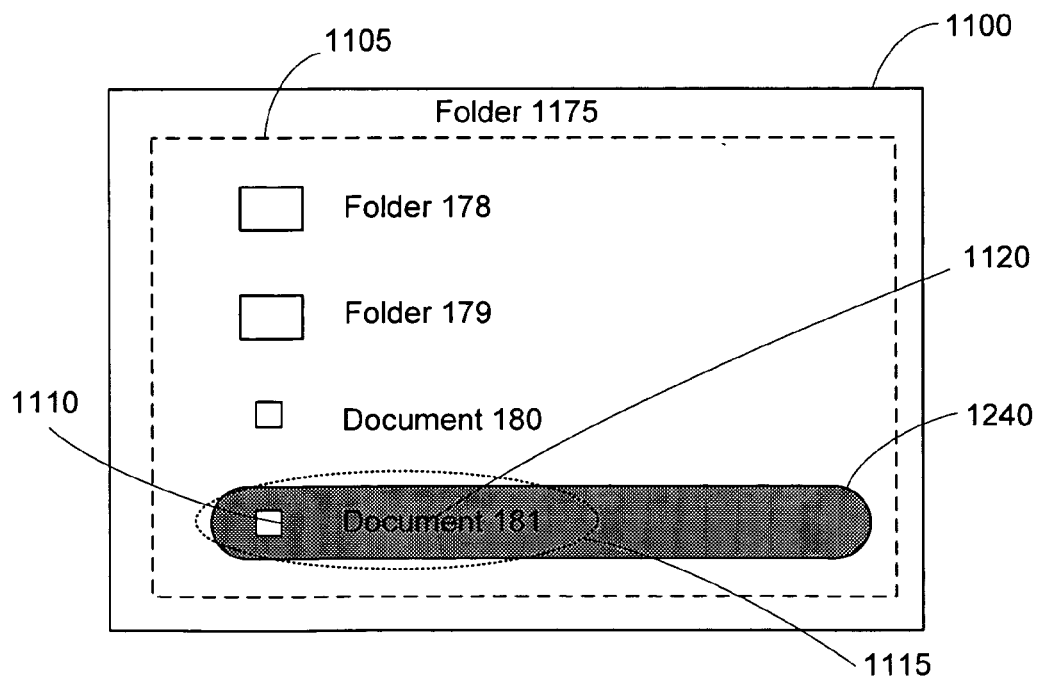
FIG. 12 illustrates a window after a document has been color-labeled according to some embodiments of the present invention.

FIG. 12 illustrates the window 1100 after a document has been labeled according to some embodiments of the invention. In FIG. 12, a color label has been applied to a background region 1240 that surrounds document icon 1115. As shown in FIG. 12, the color-label does not distort either the image element 1110 or the text element 1120 of the document icon 1115, according to the present invention.

Figure 13:
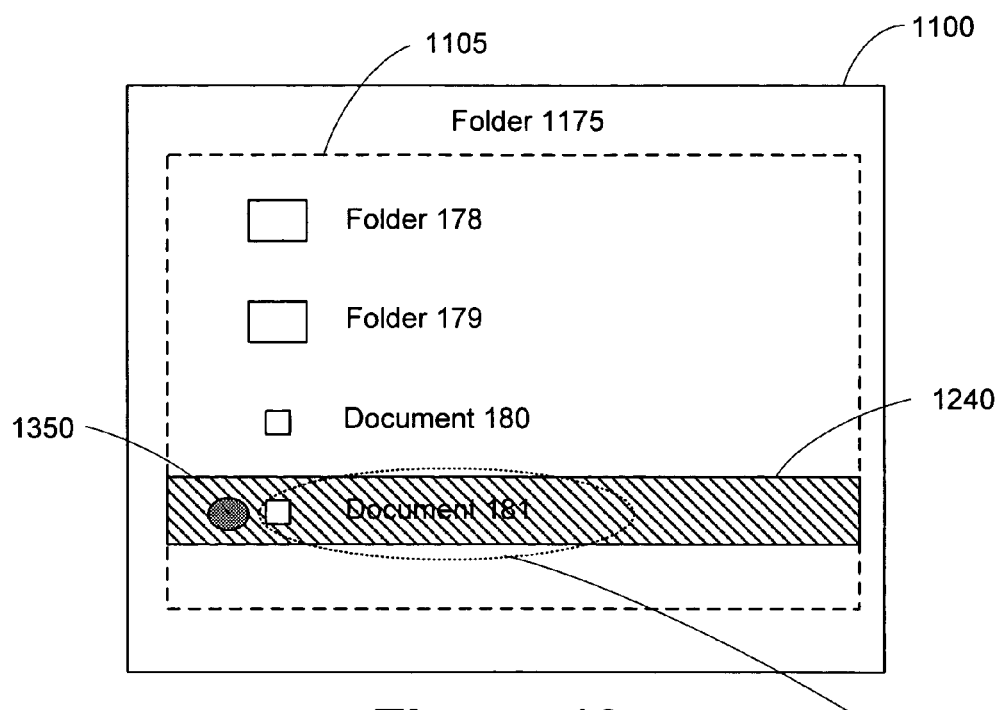
FIG. 13 illustrates a window after a color-labeled icon has been selected.

FIG. 13 illustrates the window 1100 after the color-labeled icon 1115 has been selected. The selection of icon 1115 changes the color of most of the background-region 1240 of the icon 1115, without distorting either the image element 1110 or the text element 1120 of the icon 1115.

Figure 14:
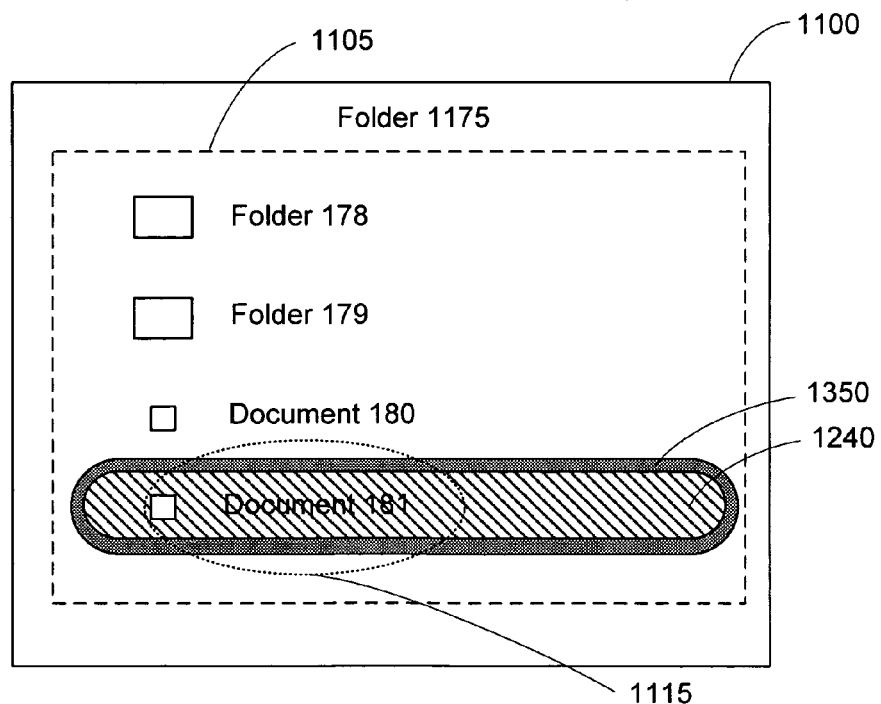
FIG. 14 shows that a section that retains its color-label might be a section along the border of the background-region.

According to some embodiments of the invention, a section 1350 of the background-region 1240 retains its original color label to provide a visual clue to the user as to the color label of the selected icon 1115. In the example illustration in FIG. 13, the section 1350 is a small circle to the left of the icon 1115. The section 1350, however, can have other shapes in other embodiments. For instance, as shown in FIG. 14, the section 1350 might be a section along the border of the background-region. In other embodiments, this section that retains its color label could be in the shape of a triangle or a square, for example.

Figure 15:
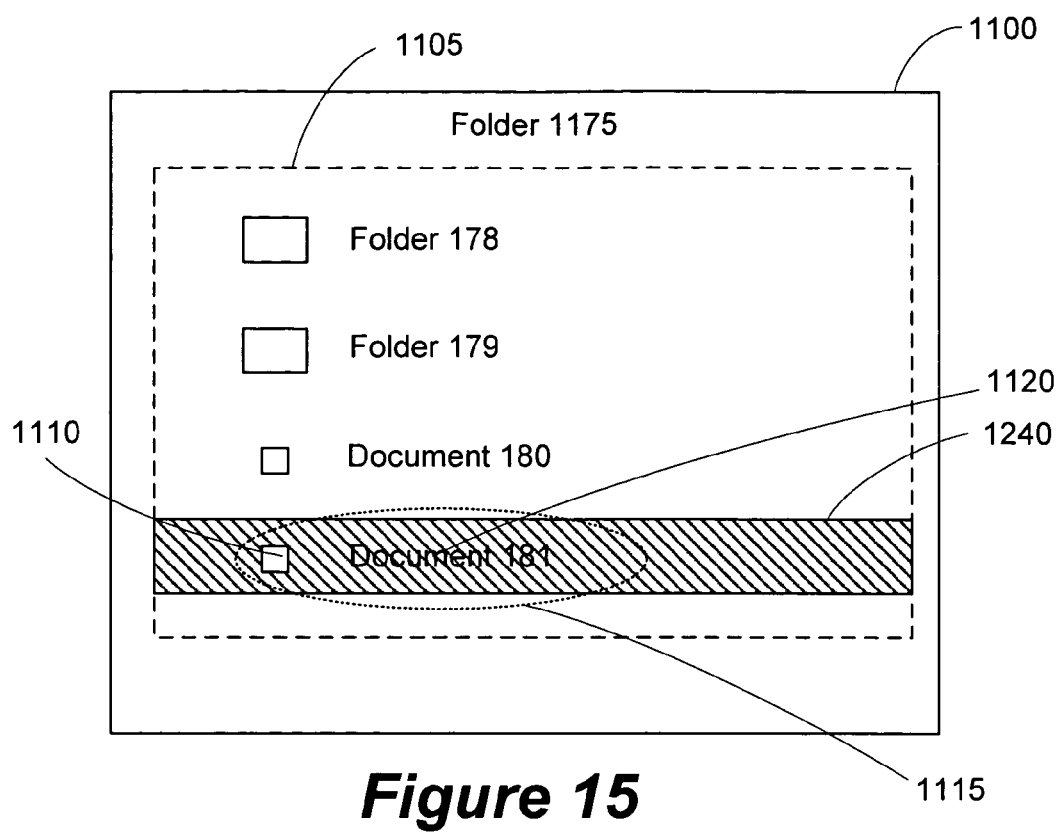
FIG. 15 illustrates an embodiment where the label-color of an icon is no longer visible because the background-region color changes to a selection-color after it has been selected.

Alternatively, when the icon has been selected, some embodiments might not display any portion of the color label of an icon that is displayed in the list view. FIG. 15 illustrates an example of such an approach. Specifically, for some embodiments, this figure illustrates the icon 1115 after it has been selected. As shown in this figure, the background-region 1240 of the icon 1115 has a color (represented by diagonal dash lines) that is different than this region's label color, which was illustrated in FIG. 12. As shown in FIG. 15, the color that is used to highlight the selection of the icon 1115 does not distort either the image element 1110 or the text element 1120 of icon 1115.

Various permutations of the examples described above would be apparent to one of ordinary skill. For instance, the shape that retains the label-color can be of various sizes and shapes that appear at various locations relative to the corresponding icon. Moreover, the background-region of the text element can also have various sizes and geometric properties. For instance, the background-region can have rounded or squared ends. Further, the background-region can apply to either the text element or the image element of the icon, or both, depending on the current view settings.

V. COLUMN-VIEW

A "column-view" illustration presents a nested file structure in terms of a set of nested columns. Each of these columns in some embodiments presents a list of the contents of a folder in the nested file system. When a folder is "opened," some embodiments (1) show the contents of that folder in the next column to the right of the column containing the opened folder, and (2) color a background region that surrounds the opened folder to indicate that its contents are shown in the next column. In some embodiments, the color that is used to highlight the selection of a folder does not distort either the image element or the text element of this folder's icon.

In such a column-view illustration, some embodiments allow a user to specify different color labels to the folders and files (including documents) displayed in this illustration. Different embodiments of the invention apply the color label differently to a folder or a file. Some embodiments apply the color label to a region that encompasses just the text element of an icon of the folder or the file, other embodiments apply it to a region that encompasses just the image element of the icon, and yet other embodiments apply it to a region that encompasses both the text and image elements of the icon. In some embodiments, the color that is used to label a folder or file does not distort either the image element or the text element of the icon of the folder or file.

Figure 16:
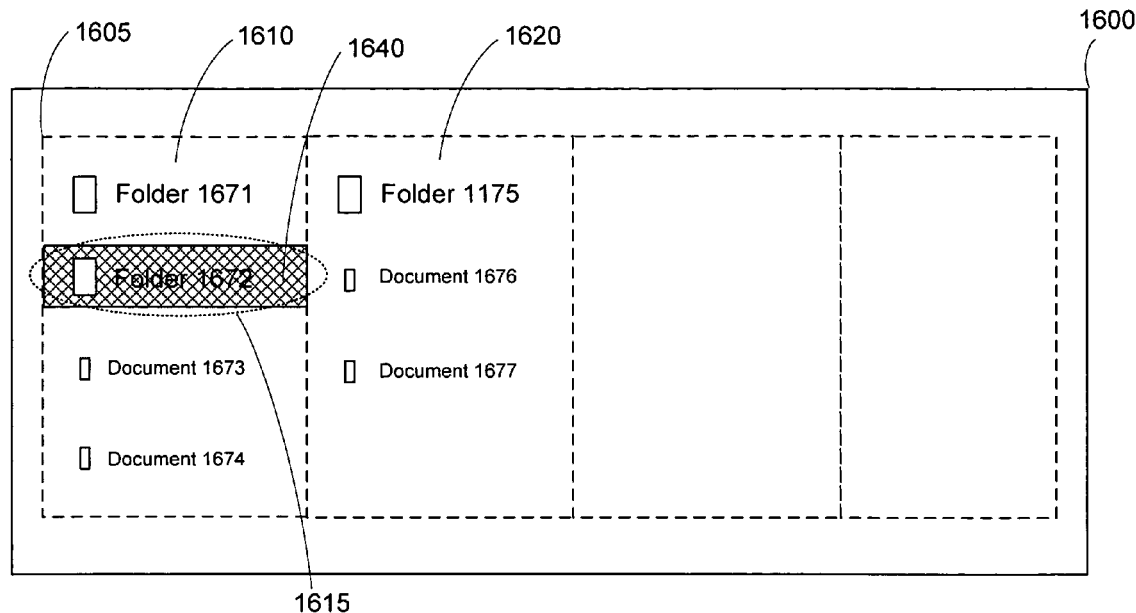
FIG. 16 illustrates a window in a GUI. This window provides a "column-view" illustration of a nested file structure in terms of two nested columns.

FIGS. 16-19 illustrate an example of applying color labels in a column-view illustration of a nested file structure. Specifically, FIG. 16 illustrates a window 1600 in a GUI. This window provides a "column-view" illustration 1605 of a nested file structure in terms of two nested columns 1610 and 1620. Four icons are listed in column 1610. Two of these icons represent folders 1671 and 1672, while the other two represent documents 1673 and 1674.

The column 1620 illustrates the contents of the folder 1672 in the column 1610. As shown in FIG. 16, the background region 1640 that surrounds the folder 1672 has a particular color (shown by cross-hatched diagonal lines) in order to indicate that its contents are shown in the next column 1620. As shown in this figure, the color that is used to highlight the selection of the folder 1672 does not distort either the image element or the text element of this folder's icon. As shown in FIG. 16, the column 1620 illustrates that the folder 1672 has three icons that respectively represent one folder, 1175, and two documents 1676 and 1677. In FIG. 16, no icon illustrated in window 1600 has been color labeled by a user.

Figure 17:
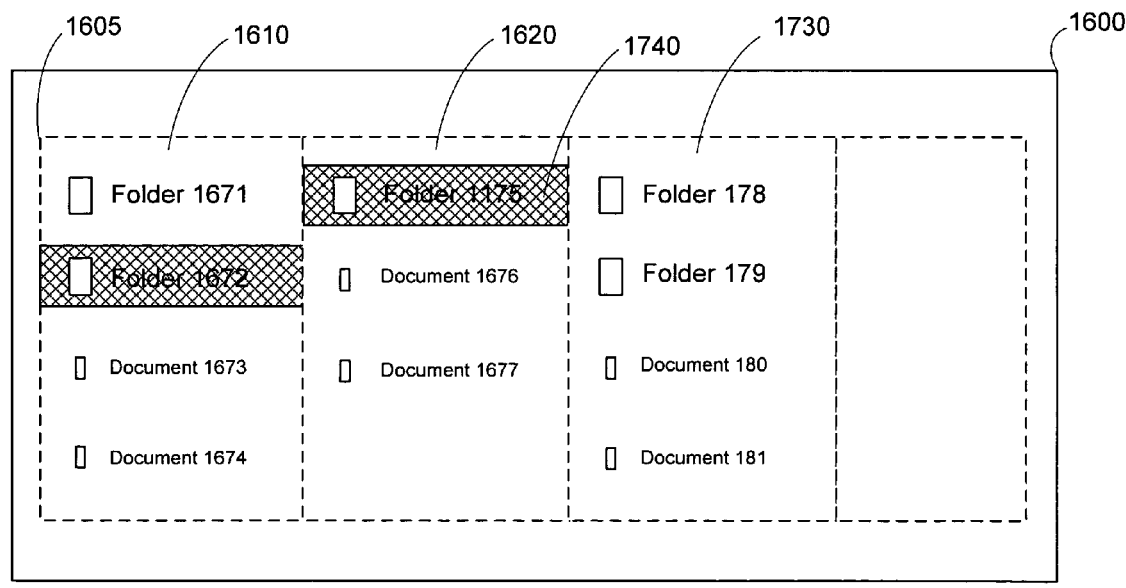
FIG. 17 illustrates a window of FIG. 16 after selection and opening of a folder in a column of a column-view.

FIG. 17 illustrates the window 1600 after the selection and opening of the folder 1175 in the column 1620. As shown in this figure, this selection leads to (1) the coloring of a background region 1740 that surrounds the folder 1175 to indicate its opening, and (2) the presentation of a third column 1730 in the column-view illustration 1605. The third column 1730 illustrates that the folder 1720 contains four icons, which represent two folders 178 and 179, and two documents 180 and 181. In FIG. 16, no icon illustrated in window 1600 has been color labeled by a user.

Figure 18:
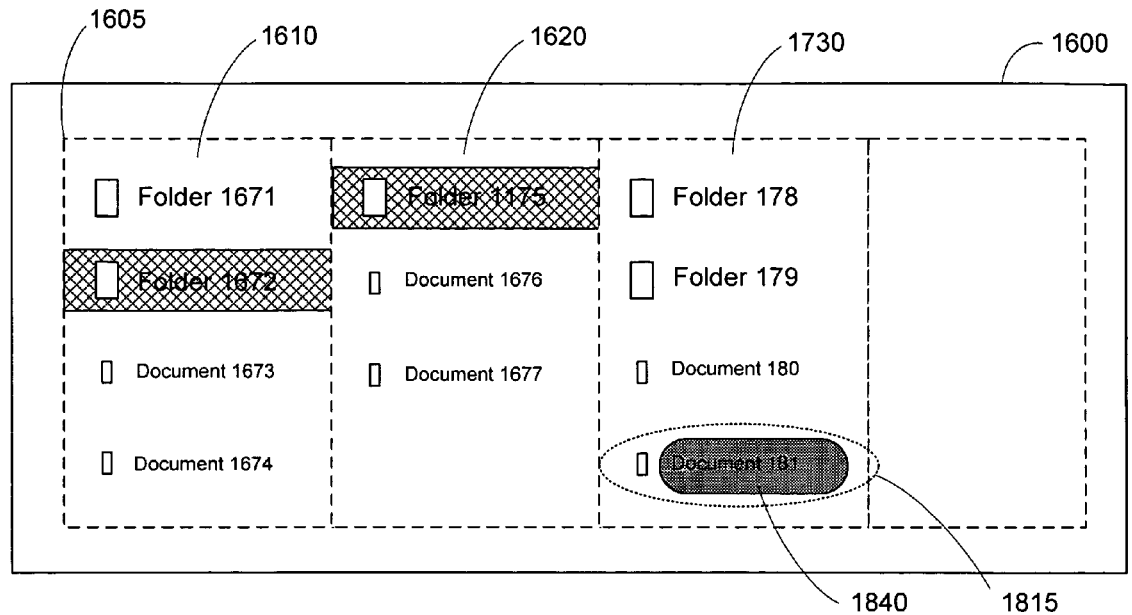
FIG. 18 illustrates a window after a user has defined a color label to an icon that represents a document in an open folder.

FIG. 18 illustrates the window 1600 after a user has defined a color label to an icon 1815 that represents the document 181 in the folder 1175. This figure illustrates the color label in terms of a solid shade. As indicated by this solid shade, the color label is applied to a background region 1840 that surrounds just the text element of icon 1815. Other embodiments, however, might apply the color label to a region that encompasses the entire icon, or just the image element of the icon 1815.

Figure 19:
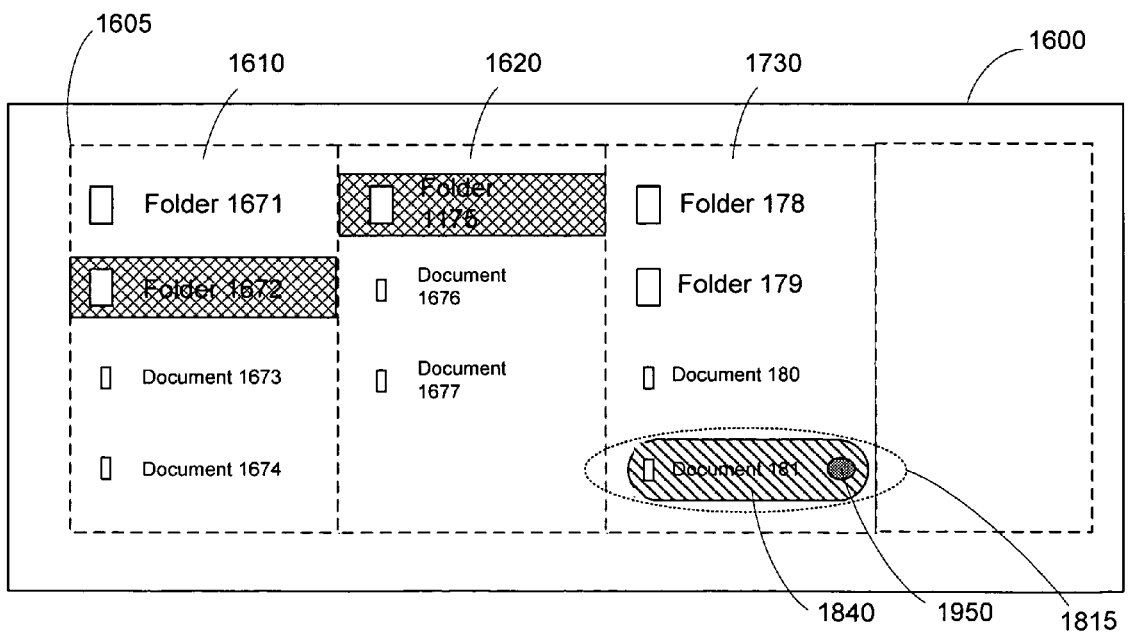
FIG. 19 illustrates a window after a user selects an icon.

FIG. 19 illustrates the window 1600 after a user selects the icon 1815. The selection of icon 1815 changes the color of most of a background-region 1840 that encompasses the icon 1815, without distorting either the image element or the text element of icon 1815.

According to some embodiments of the invention, a section 1950 of the background-region 1840 retains its original color label to provide a visual clue to the user as to the color label of the selected icon 1815. In the example illustration in FIG. 19, the section 1950 is a small circle to the right of the icon 1815. The section 1950, however, can have other shapes in other embodiments. For instance, as shown in the FIG. 20, the section that retains its color label might be a section along the border of the background-region. In other embodiments, section 1950 could be in the shape of a triangle or a square, for example.

Figure 21:
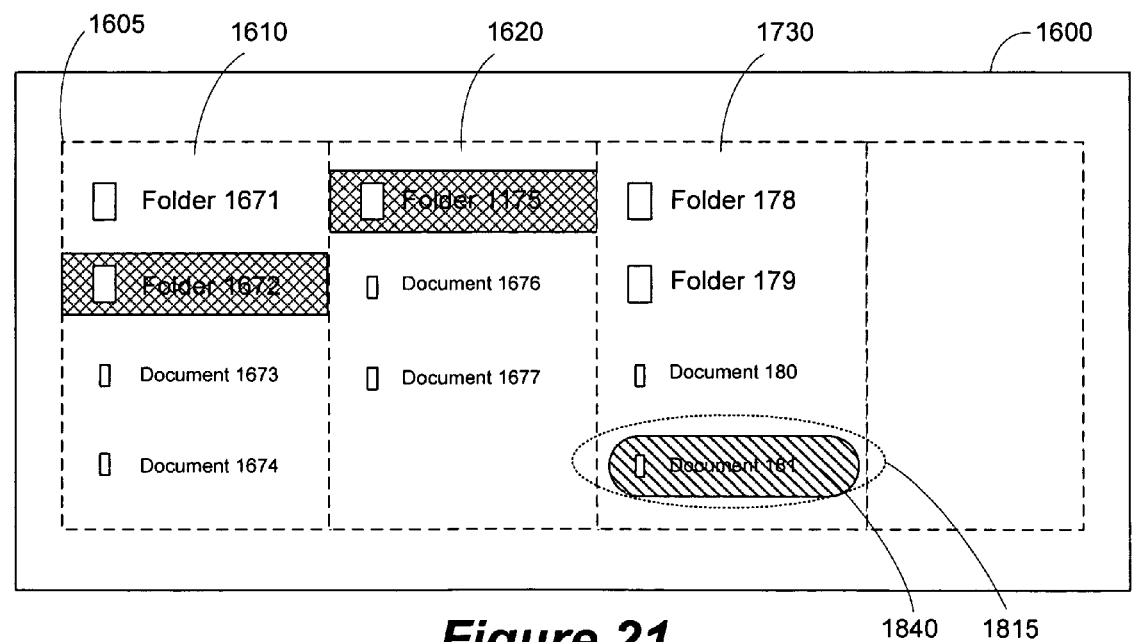
FIG. 21 illustrates an embodiment where the background-region of a selected-icon has a color that is different than this region's label-color, which was illustrated in FIG. 19.

Alternatively, when the icon has been selected, some embodiments might not display any portion of the color label of an icon that is displayed in the list view. FIG. 21 illustrates an example of such an approach. Specifically, for some embodiments, this figure illustrates the icon 1815 after it has been selected. As shown in FIG. 21, the background region 1840 of the icon 1815 has a color (represented by diagonal dash lines) that is different than this region's label color, which was illustrated in FIG. 18. As shown in FIG. 21, the color that is used to highlight the selection of the icon 1815 does not distort either the image element or the text element of icon 1815.

Various permutations of the examples described above would be apparent to one of ordinary skill. For instance, the shape that retains the label-color can be of various sizes and shapes that appear at various locations relative to the corresponding icon. Moreover, the background-region of the text element can also have various sizes and geometric properties. For instance, the background-region can have rounded or squared ends. Further, the background-region can apply to either the text-element or the image-element of the icon, or both, depending on the current view settings.

Figure 20:
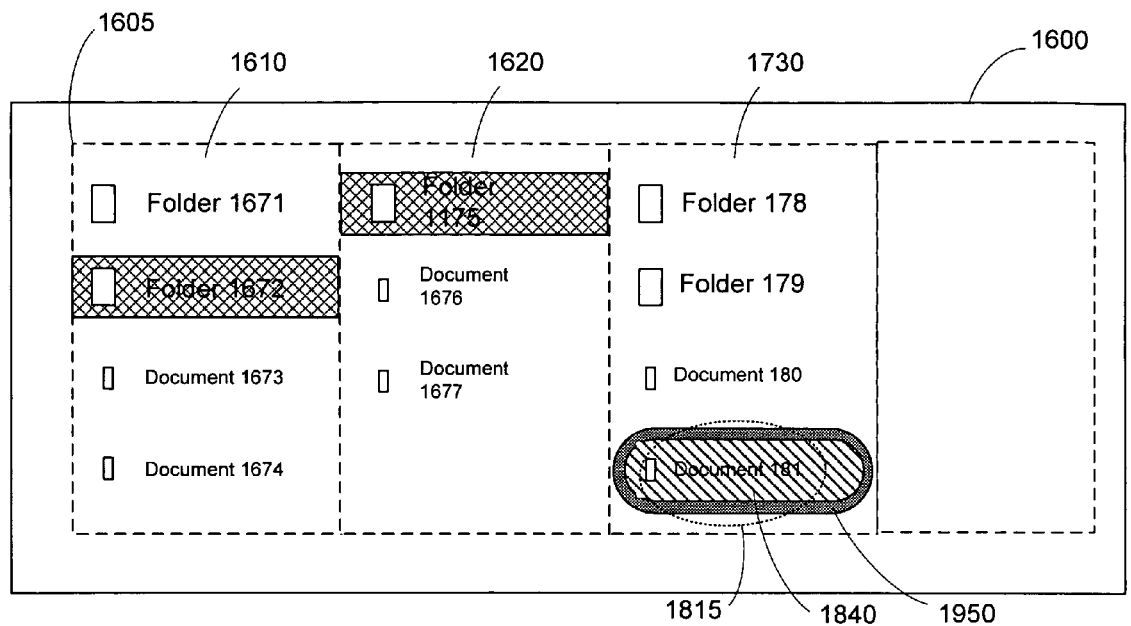
FIG. 20 illustrates an embodiment where a section along the border of the background-region retains its color-label.
Figure 22:
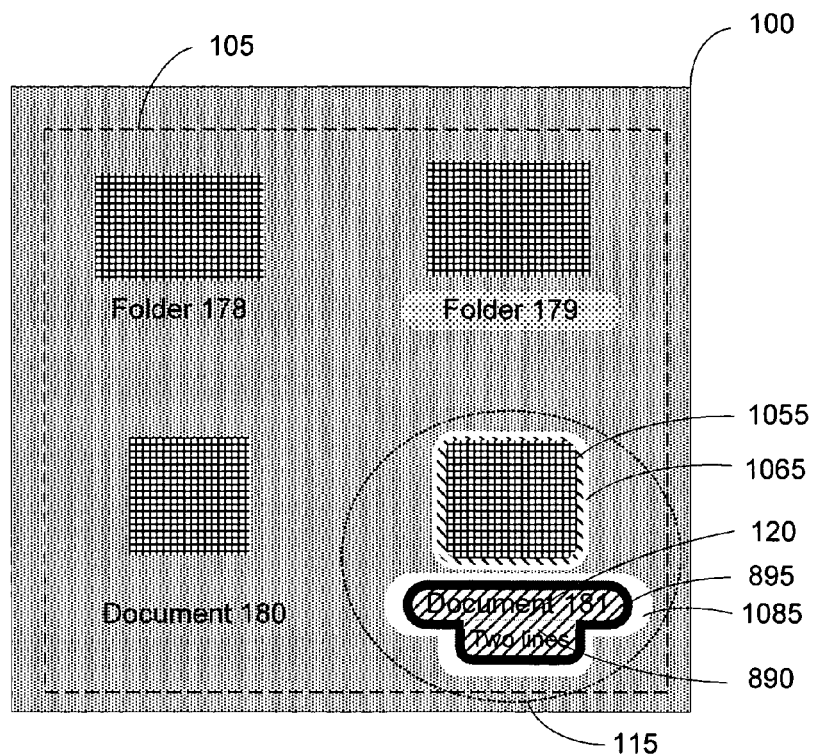
FIG. 22 illustrates an embodiment where an image element of an icon is not distorted or deprecated, in accordance with the present invention.

Many of the embodiments described above in relation to color-labeling are also applicable to the present invention's methods for providing to a user visual cues during icon-selection. For example, none of the figures show either the image or text element of the icon being deprecated whether the icon is color-labeled, selected, or opened. Specifically, FIG. 22 illustrates an embodiment where an image element of an icon is not distorted or deprecated, in accordance with the present invention. In FIG. 22, the image-element of the icon 115 is represented by a square containing grid-line shading. The gridline shading in FIG. 22 is used to emphasize this aspect of the present invention. As shown by the section 895 and background-region 890, icon 115 in FIG. 22 is both color-labeled and selected, however, the integrity of the visual information contained in the elements of icon 115, is preserved according to the present invention. Similarly, as shown in FIG. 20, the elements of the icons in window 1600 are preserved whether the icons are color-labeled, selected, or opened. The icons in FIG. 20 are represented as un-shaded rectangles to emphasize this feature of the present invention.

Figure 23:
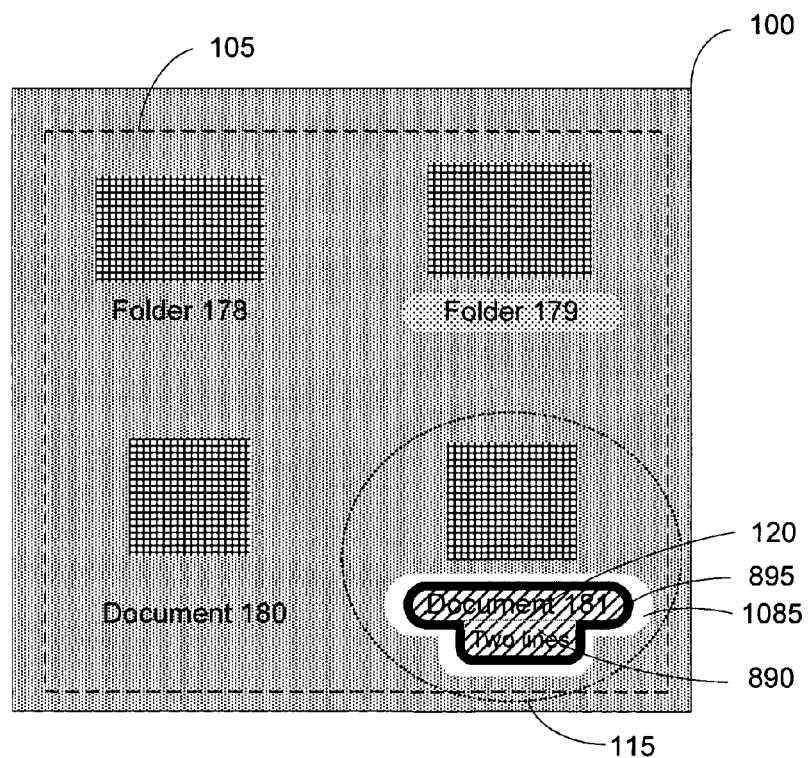
FIG. 23 illustrates an embodiment where a label-color and a selection-color are applied to a text-element without being applied to an image-element of an icon.

Also in accordance with the present invention, the selection-color and label-color may simply not be applied to either the text or the image element of an icon to avoid any deprecation of that element. For instance, FIG. 23 illustrates an embodiment where a label-color and a selection-color are applied to a text-element without being applied to an image-element of an icon. This embodiment is also useful where only one element of an icon is present in the GUI.

Figure 24:
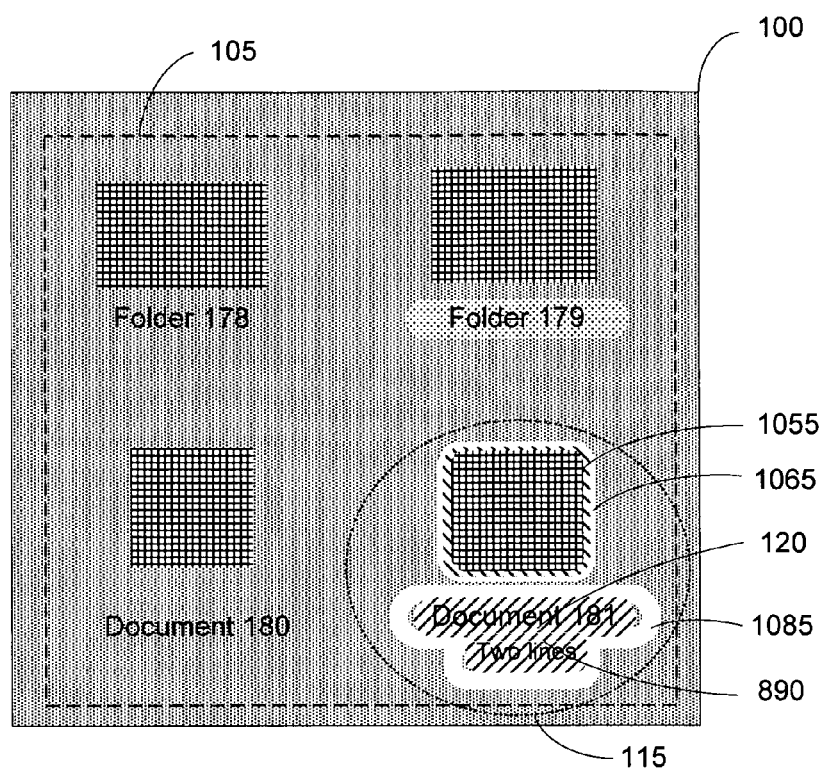
FIG. 24 illustrates an embodiment a selection-color and white-outline are applied to an icon that has not been color-labeled.

The present invention's method for providing visual cues to a user during icon-selection is applicable to an icon regardless of whether the icon has been color-labeled. FIG. 24 illustrates an embodiment where a selection-color and white-outline are applied to an icon 115 that has not been color-labeled. The selection-color and white-outline are applicable to either the icon's text or image element, or both, in accordance with the present invention.

Figure 25:
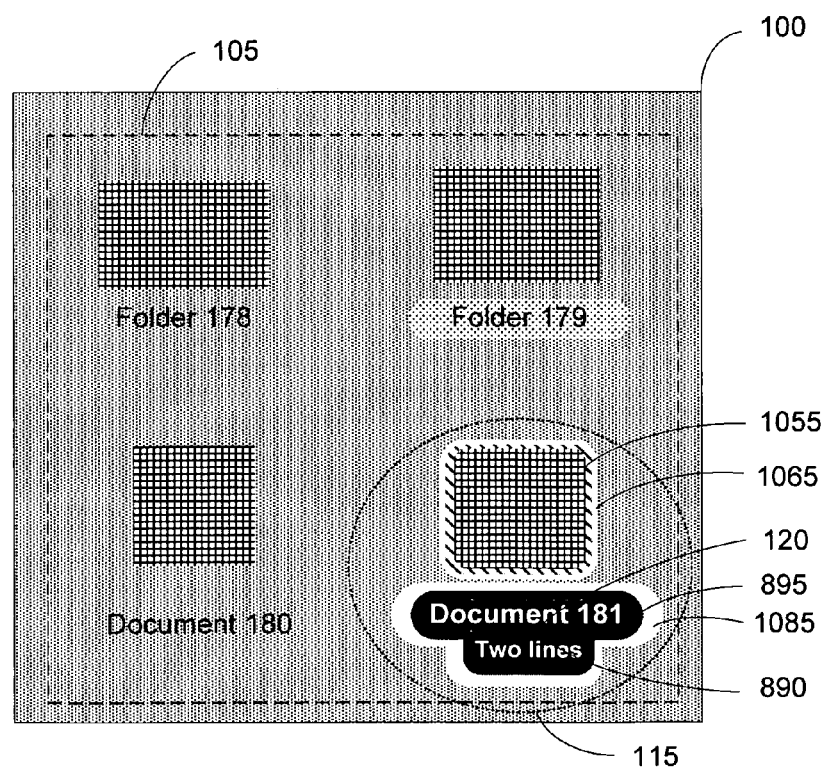
FIG. 25 illustrates an embodiment where selection of an icon changes the font-color of a text-element to white.

During color-labeling of an icon, the text-element's font may or may not be altered to improve readability or enhance the visual cue stimulus. Likewise, during icon-selection, the text-element's font may be altered. FIG. 25 illustrates an embodiment where selection of an icon 115 changes the font-color of a text-element 120 to white. However, one of ordinary skill will recognize that this color can be any color of the spectrum. As shown in FIG. 25, for example, the color can be chosen to match white-outline 1085 or to offset a dark selection-color in background-region 890.

VI. COMPUTER SYSTEM

Figure 26:
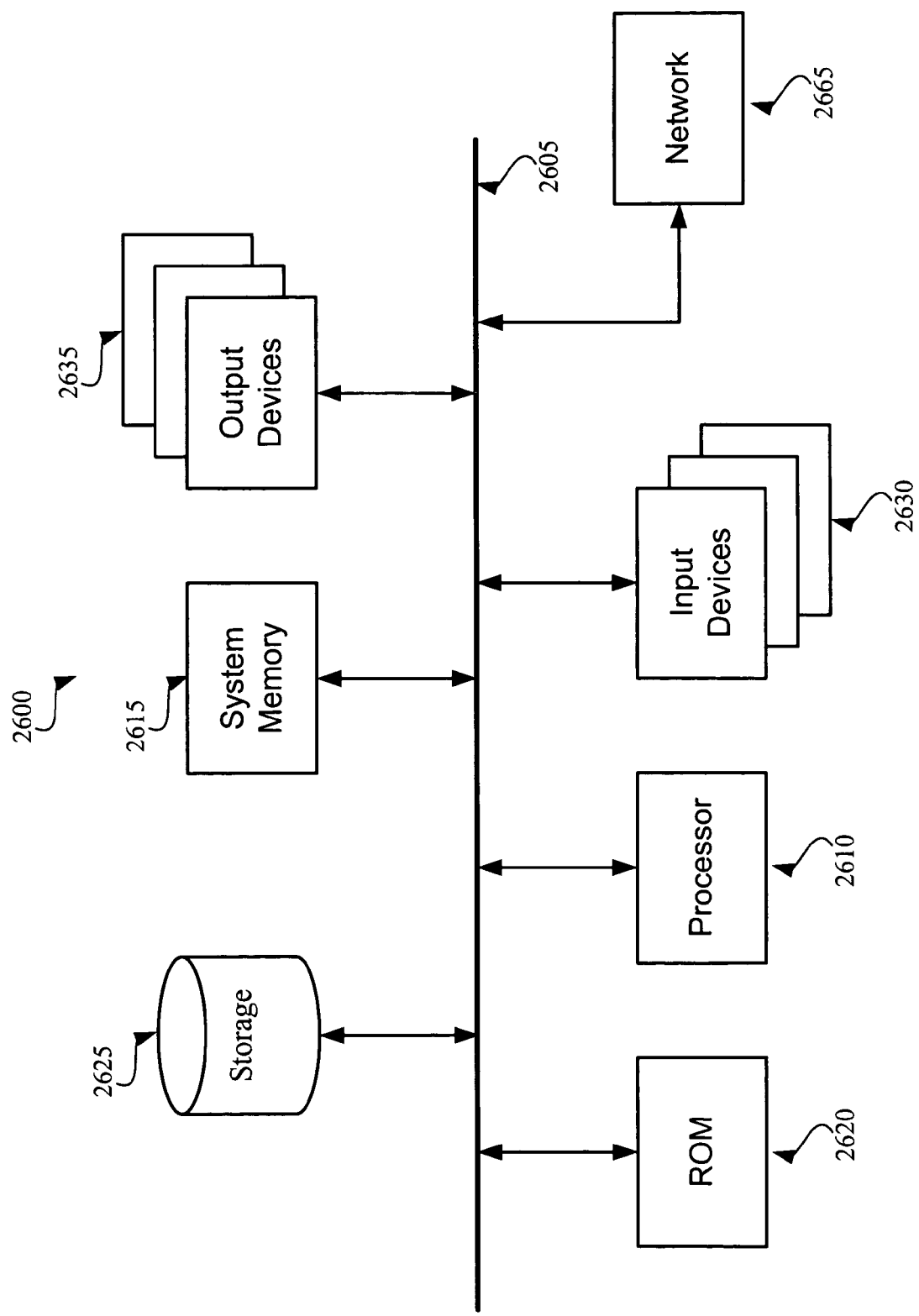
FIG. 26 illustrates a computer system and computer readable medium with which some embodiments of the present invention are implemented.

FIG. 26 presents a computer system with which one embodiment of the invention is implemented. Computer system 2600 includes a bus 2605, a processor 2610, a system memory 2615, a read-only memory 2620, a permanent storage device 2625, input devices 2630, and output devices 2635. The bus 2605 collectively represents all system, peripheral, and chipset buses that communicatively connect the numerous internal devices of the computer system 2600. For instance, the bus 2605 communicatively connects the processor 2610 with the read-only memory 2620, the system memory 2615, and the permanent storage device 2625.

From these various memory units, the processor 2610 retrieves instructions to execute and data to process in order to execute the processes of the invention. The read-only-memory (ROM) 2620 stores static data and instructions that are needed by the processor 2610 and other modules of the computer system.

The permanent storage device 2625, on the other hand, is a read-and-write memory device. This device is a non-volatile memory unit that stores instruction and data even when the computer system 2600 is off. Some embodiments of the invention use a mass-storage device (such as a magnetic or optical disk and its corresponding disk drive) as the permanent storage device 2625.

Other embodiments use a removable storage device (such as a floppy disk or Zip® disk, and its corresponding disk drive) as the permanent storage device. Like the permanent storage device 2625, the system memory 2615 is a read-and-write memory device. However, unlike storage device 2625, the system memory is a volatile read-and-write memory, such as a random access memory. The system memory stores some of the instructions and data that the processor needs at runtime. In some embodiments, the invention's processes are stored in the system memory 2615, the permanent storage device 2625, and/or the read-only memory 2620.

The bus 2605 also connects to the input and output devices 2630 and 2635. The input devices enable the user to communicate information and select commands to the computer system. The input devices 2630 include alphanumeric keyboards and cursor-controllers. The output devices 2635 display images generated by the computer system. The output devices include printers and display devices, such as cathode ray tubes (CRT) or liquid crystal displays (LCD).

Finally, as shown in FIG. 26, bus 2605 also couples computer 2600 to a network 2665 through a network adapter (not shown). In this manner, the computer can be a part of a network of computers (such as a local area network ("LAN"), a wide area network ("WAN"), or an Intranet) or a network of networks (such as the Internet).

Any or all of the components of computer system 2600 may be used in conjunction with the invention. However, one of ordinary skill in the art would appreciate that any other system configuration may also be used in conjunction with the present invention.

VII. ADVANTAGES

The different visual formats of the icon, list, and column views are designed to present information in ways that facilitate understanding and manipulation of their contents. However, manipulation of the icons and views can alter the icon's appearance and thus obscure the icon's visual information. Also, the volume of information presented in each view of a file system can be large such that a high demand is placed on the attention and concentration of the user of the GUI. However, the present invention provides a method of providing visual cues that assist a user interacting with icons in a GUI. Some advantages of the present invention are described below.

To increase organization and reduce errors, a user can organize folders and documents using a color-coded labeling system. For example, a folder bearing a certain importance could be associated with the color red. Related documents with the same level of importance could also be associated with the color red. In this manner, a user could manually organize folders and documents. Also, an application or operating system service could automatically provide the organization by, for example, grouping any documents associated with the color red into the folder associated with the color red. Similarly, a variety of system processes could be automated to perform tasks on files and folders that have been labeled in this manner. For instance, a system backup could be performed on all of the folders and documents with a certain color label.

Another advantage of a color-coded labeling system is that it provides visual cues to the user similar to the manner in which an icon's image element provides additional information and cues to the user. Thus, iconographic and color-label information supplements or provides an alternative to the information available to a user from an icon's text element. The text element typically names a folder or document represented by the icon. Previously, however, use of a color-coded labeling system in conjunction with graphical icons could interfere with the icon's visual information by altering the appearance of the icon or deprecating the icon. The present invention, however, provides visual cues that enhance rather than deprecate or interfere with an icon's visual information presented in a GUI. The present invention preserves an icon's visual information by presenting the additional color-label information in a manner that does not distort either the text or the graphic elements of the icon. For example, some of the methods described herein apply color to shapes that surround the icon rather than coloring the icon directly. Another method of preserving the visual contents of an icon could be to layer the icon (text and graphic) opaquely over the label and selection colors. The label and selection colors can, in turn, be layered opaquely over the background color such as the color of the window pane. As would be apparent to one of ordinary skill, this layering may not require 100% opacity. The layering of different colors in a GUI may be performed at various opacities and blends to achieve a multitude of desired effects using the text and image elements of icons in conjunction with color combinations.

Additionally, there may be instances in a GUI where the only visual information available to a user is in the form of an icon's text element, and the icon has no image element. Similarly, an icon can have a text element but no image element. For example, in a column or list view of folders and documents, an icon may have a text element but may not have a corresponding image element, or the corresponding image element, if any, may be diminished in size such that its visual information is not conveyed to the user. However, the present invention can be applied to either the text or image element of an icon. Thus, the present invention conveys visual cues for icons without a corresponding text or image element, and for diminished or impaired icons such as folder and document icons in column or list view.

Cursor controllers, such as a computer mouse, are used to interact with icons of a GUI. For example, a user may activate a selection button of the cursor controller to select an icon in the GUI. Typically, when an icon is selected in the GUI, its appearance is altered to show that it is currently selected. This alteration of appearance can be, for example, a change in the color of the icon using the GUI's "highlight" color. However, a change in the color of an icon can obscure or interfere with the color label applied to the icon or with the visual integrity of the icon itself. The present invention provides a method of providing visual cues that retains and continues to convey an icon's color label and visual information when the icon is selected and thereby highlighted.

While the invention has been described with reference to numerous specific details, one of ordinary skill in the art will recognize that the invention can be embodied in other specific forms without departing from the spirit of the invention. For instance, some embodiments have been described with reference to an operating system but the graphical user interface teachings of the present invention may be used in any application. One of ordinary skill in the art would understand that the invention is not to be limited by the foregoing illustrative details, but rather is to be defined by the appended claims.

I claim:

1. A method for providing, in a graphical user interface (GUI) for a computer system, a visual cue to a user, the method comprising:
   receiving a first user selection of an icon that comprises a background region;
   receiving a user selection of a first color to color label the icon;
   in response to the user selection of the first color, applying the first color to the background region of the icon in order to color label the icon;
   receiving a second user selection of the icon after the application of the first color to the background region of the icon; and
   in response to the second user selection of the icon, replacing said first color of said background region with a second color in a first section of the background region in order to identify the selection of the icon while retaining said first color in a second section of said background region in order to retain an indication of the color label of the icon, wherein the second section is a geometric shape.

2. The method of claim 1 further comprising outlining said background region with a third color in order to delineate the color-labeling of the icon from a display area in the GUI in which the icon is located.

3. The method of claim 1, wherein said first and second user selections of the icon each comprise a click operation of a cursor controller by a user of the computer system.

4. The method of claim 3, wherein the click operation is a single click of said cursor controller.

5. The method of claim 1, wherein the geometric shape is a circle.

6. The method of claim 1, wherein the geometric shape is a square.

7. A non-transitory computer readable medium storing a computer program for providing a graphical user interface, said computer program executable by at least one processor, said computer program comprising sets of instructions for:
   receiving a first selection of an icon that comprises a background region;
   receiving a selection of a first color to label the icon;
   in response to the selection of the first color, applying the selected first color to the background region of the icon in order to color label the icon;
   after applying the first color to the background region of the icon, receiving a second selection of the icon; and
   in response to the second selection of the icon:
   (i) retaining said first color in a first section of said background region in order to retain an indication of the color label of the icon, wherein the first section is a geometric shape; and
   (ii) replacing said first color in a different section of said background region with a second color in order to indicate the selection of the icon.

8. A non-transitory computer readable medium storing a computer program comprising a graphical user interface (GUI) for a computer system, said GUI comprising:

a user-interface tool for displaying a plurality of colors that are selectable by a user to label at least two different icons with at least two different colors; and a display area for displaying at least one icon, said at least one icon comprising a background region, said background region comprising a first portion and a second portion, wherein the first and second portions are for:

(i) display without any color when the icon is not selected and no color has been selected to label the icon; and (ii) display in a first color from the plurality of user-selectable colors when the icon is unselected and the first color has been selected from the plurality of user-selectable colors in order to color label the icon, wherein the first portion is further for display with a second color replacing the first color when the icon is selected after the first color has been selected in order to indicate the selection of the icon while the second portion is further for display with the first color retained when the icon is selected after the first color has been selected in order to continue indicating the color label of the icon wherein the second portion is a geometric shape.

9. The non-transitory computer readable medium of claim 8, wherein said second color is a selection-color.

10. The non-transitory computer readable medium of claim 8, wherein said GUI further comprises an outline around said second portion, said outline comprising a third color.

11. A method for specifying a graphical user interface (GUI) for display on a display device, the method comprising:

in response to a user selection of a first color, applying the first color to a particular icon in order to label the particular icon; and upon a subsequent user selection of the particular icon, applying a second color to the particular icon except for a portion of the particular icon which retains the first color, the second color providing an indication of the selection of the particular icon while the retention of the first color provides a continuing label of the particular icon while the particular icon is selected, wherein the portion is a geometric shape, wherein said first and second colors are different from a third color of a background of a display area in which said particular icon is located.

12. The method of claim 11, wherein the particular icon comprises more than one element, wherein the first color is retained for a first portion of a particular element and the second color is applied to a second portion of the particular element.

13. The method of claim 11, wherein the particular icon comprises a text element, wherein the first color is retained for a first portion of the text element and the second color is applied to a second portion of the text element.

14. The method of claim 11 further comprising displaying the particular icon when the second color is applied.

15. The method of claim 11, wherein the portion of the particular icon that retains the first color is an outline of the particular icon.

16. The method of claim 11, wherein the first color is applied to the particular icon after receiving a selection of a label color for the particular icon.

17. A method for specifying a graphical user interface (GUI) for display on a display device, the method comprising:

providing a particular icon for labeling with a first color in order to provide a visual cue about the particular icon when the particular icon is selected via a first user selection of the particular icon and the first color is selected via a user selection of the first color; and specifying a second color for applying to a first portion of the particular icon to indicate selection of the particular icon when the particular icon is selected after the application of the first color to the particular icon, wherein a second portion of the particular icon retains the first color when the particular icon is selected in order to continue providing the visual cue about the particular icon, wherein the second portion is a geometric shape.

18. The method of claim 17, wherein the second portion of the particular icon that retains the first color is an outline of the particular icon.

19. A non-transitory computer readable medium storing a computer program comprising a graphical user interface (GUI) for a computer system, said GUI comprising:

a) a display area for displaying icons; and b) at least one particular icon displayed in the display area, the particular icon comprising a particular element that is displayed by using a first labeling color, applied in response to a user selection of the first labeling color, to provide a visual cue to a user about the particular icon when the particular icon is not selected by a user, wherein when the particular icon is selected by a user while the particular element is displayed with the first labeling color a second color is applied to the particular icon, the second color applied only to a first portion of the particular element to indicate the selection of the particular icon while a second portion of the particular element retains the first color to provide the visual cue to the user, wherein the second portion is a geometric shape.

20. The non-transitory computer readable medium of claim 19, wherein the second portion of the particular element is an outline located about the particular element.

21. A method for providing, in a graphical user interface (GUI) for a computer system, a visual cue to a user, the method comprising:

receiving a first user selection of an icon that comprises a background region;

receiving a user selection of a first color to color label the icon;

in response to the user selection of the first color, applying the first color to the background region of the icon in order to color label the icon;

receiving a second user selection of the icon after the application of the first color to the background region of the icon; and in response to the second user selection of the icon, replacing said first color of said background region with a second color in a first section of the background region in order to identify the selection of the icon while retaining said first color in a second section of said background region in order to retain an indication of the color label of the icon, wherein the second section is a section outlining the background region.

22. The method of claim 21, wherein said first and second user selections of the icon each comprise a click operation of a cursor controller by a user of the computer system.

23. A non-transitory computer readable medium storing a computer program for providing a graphical user interface, said computer program executable by at least one processor, said computer program comprising sets of instructions for:

receiving a first selection of an icon that comprises a background region;

receiving a selection of a first color to label the icon;

in response to the selection of the first color, applying the selected first color to the background region of the icon in order to color label the icon;

after applying the first color to the background region of the icon, receiving a second selection of the icon; and in response to the second selection of the icon:
(i) retaining said first color in a first section of said background region in order to retain an indication of the color label of the icon, wherein the first section is a section outlining the background region; and
(ii) replacing said first color in a different section of said background region with a second color in order to indicate the selection of the icon.

24. The non-transitory computer readable medium of claim 23, wherein said first and second user selections of the icon each comprise a click operation of a cursor controller by a user of the computer system.

25. A non-transitory computer readable medium storing a computer program comprising a graphical user interface (GUI) for a computer system, said GUI comprising:
a user-interface tool for displaying a plurality of colors that are selectable by a user to label at least two different icons with at least two different colors; and
a display area for displaying at least one icon, said at least one icon comprising a background region, said background region comprising a first portion and a second portion, wherein the first and second portions are for:
(i) display without any color when the icon is not selected and no color has been selected to label the icon; and
(ii) display in a first color from the plurality of user-selectable colors when the icon is unselected and the first color has been selected from the plurality of user-selectable colors in order to color label the icon,
wherein the first portion is further for display with a second color replacing the first color when the icon is selected after the first color has been selected in order to indicate the selection of the icon while the second portion is further for display with the first color retained when the icon is selected after the first color has been selected in order to continue indicating the color label of the icon, wherein the second portion is a portion outlining the background region.

26. The non-transitory computer readable medium of claim 25, wherein said second color is a selection-color.

27. A method for specifying a graphical user interface (GUI) for display on a display device, the method comprising:
in response to a user selection of a first color, applying the first color to a particular icon in order to label the particular icon; and
upon a subsequent user selection of the particular icon, applying a second color to the particular icon except for a portion of the particular icon which retains the first color, the second color providing an indication of the selection of the particular icon while the retention of the first color provides a continuing label of the particualr icon while the particular icon is selected, wherein the portion is a portion outlining the particular icon,
wherein said first and second colors are different from a third color of a background of a display area in which said icon is located.

28. The method of claim 27, wherein the particular icon comprises more than one element, wherein the first color is retained for a first portion of a particular element and the second color is applied to a second portion of the particular element.

29. The method of claim 27, wherein the particular icon comprises a text element, wherein the first color is retained for a first portion of the text element and the second color is applied to a second portion of the text element.

30. The method of claim 27, further comprising displaying the particular icon when the second color is applied.

31. The method of claim 27, wherein the first color is applied to the particular icon after receiving a selection of a label color for the particular icon.

32. A method for specifying a graphical user interface (GUI) for display on a display device, the method comprising:
providing a particular icon for labeling with a first color in order to provide a visual cue about the particular icon when the particular icon is selected via a first user selection of the particular icon and the first color is selected via a user selection of the first color; and
specifying a second color for applying to a first portion of the particular icon to indicate selection of the particular icon when the particular icon is selected after the application of the first color to the particular icon, wherein a second portion of the particular icon retains the first color when the particular icon is selected in order to continue providing the visual cue about the icon, wherein the second portion is a portion outlining the particular icon.

33. The method of claim 32, wherein the particular icon comprises a text element, wherein the first color is retained for a first portion of the text element and the second color is applied to a second portion of the text element.

34. A non-transitory computer readable medium storing a computer program comprising a graphical user interface (GUI) for a computer system, said GUI comprising:
a display area for displaying icons; and
at least one particular icon displayed in the display area, the particular icon comprising a particular element that is displayed by using a first labeling color, applied in response to a user selection of the first labeling color, to provide a visual cue to a user about the particular icon when the particular icon is not selected by a user, wherein when the particular icon is selected by a user while the particular element is displayed with the first labeling color a second color is applied to the particular icon, the second color applied only to a first portion of the particular element to indicate the selection of the particular icon while a second portion of the particular element retains the first color to provide the visual cue to the user, wherein the second portion is a portion outlining the particular element.

35. The non-transitory computer readable medium of claim 34, wherein the particular icon comprises more than one element, wherein the first color is retained for a first portion of the particular element and the second color is applied to a second portion of the particular element.

* * * * *

UNITED STATES PATENT AND TRADEMARK OFFICE
CERTIFICATE OF CORRECTION

| | | |
|---|---|---|
| PATENT NO. | : 7,873,916 B1 | Page 1 of 1 |
| APPLICATION NO. | : 10/875076 | |
| DATED | : January 18, 2011 | |
| INVENTOR(S) | : Imran Chaudhri | |

It is certified that error appears in the above-identified patent and that said Letters Patent is hereby corrected as shown below:

In column 5, line 7, after "115" insert -- . --.

In column 15, line 56, in claim 27, delete "particualr" and insert -- particular --, therefor.

In column 16, line 29, in claim 32, delete "the icon," and insert -- the particular icon, --, therefor.

Signed and Sealed this
Twenty-fifth Day of October, 2011

David J. Kappos
*Director of the United States Patent and Trademark Office*